US008572386B2

(12) United States Patent
Takekawa et al.

(10) Patent No.: US 8,572,386 B2
(45) Date of Patent: Oct. 29, 2013

(54) SECURE DEVICE, INFORMATION PROCESSING TERMINAL, INTEGRATED CIRCUIT, TERMINAL APPLICATION GENERATION APPARATUS, APPLICATION AUTHENTICATION METHOD

(75) Inventors: Hiroshi Takekawa, Tokyo (JP); Hisashi Takayama, Tokyo (JP); Ken Naka, Tokyo (JP)

(73) Assignee: Panasonic Corporation, Osaka (JP)

( * ) Notice: Subject to any disclaimer, the term of this patent is extended or adjusted under 35 U.S.C. 154(b) by 1854 days.

(21) Appl. No.: 10/910,808

(22) Filed: Aug. 4, 2004

(65) Prior Publication Data
US 2005/0033983 A1    Feb. 10, 2005

(30) Foreign Application Priority Data

Aug. 6, 2003  (JP) ................................. 2003-288271
Jul. 8, 2004  (JP) ................................. 2004-201930

(51) Int. Cl.
G06F 21/00  (2013.01)
G06F 11/30  (2006.01)
G06F 11/00  (2006.01)
G06F 12/14  (2006.01)
G06F 12/16  (2006.01)
H04L 9/32  (2006.01)

(52) U.S. Cl.
USPC ........... 713/176; 713/182; 713/184; 713/185; 713/159; 713/193; 713/188; 713/190; 726/4; 726/9; 726/20; 726/23; 705/74

(58) Field of Classification Search
USPC ......... 713/159, 176, 193, 188, 190, 182, 184, 713/185; 726/4, 23, 9, 20; 705/74
See application file for complete search history.

(56) References Cited

U.S. PATENT DOCUMENTS 5,287,407 A    2/1994  Holmes
5,721,781 A *  2/1998  Deo et al. ........................ 705/67

(Continued)

FOREIGN PATENT DOCUMENTS

EP    1 211 587 A1    6/2002
JP    2003-36419 A    2/2003

(Continued)

OTHER PUBLICATIONS

Partial European Search Report, Application No. EP 04 01 8737, dated Oct. 27, 2011.

Primary Examiner — Edan Orgad
Assistant Examiner — Kari Schmidt
(74) Attorney, Agent, or Firm — Nath, Goldberg & Meyer; Jerald L. Meyer

(57) ABSTRACT

The present invention is designed to enable a secure device to authenticate a terminal application that operates on an information processing terminal and that accesses the secure device. An application issue request transmitter (301) of the information processing terminal (30) sends a request for issue of a terminal application to an application issuer (101). The application issuer (101) of an secure device (10) reads a terminal application (31) from an application storage (105) and embeds authentication information in the terminal application (31), associates an ID and the authentication information of the terminal application (31) and save them in an issue information storage (106), and sends the terminal application (31) to an application receiver (302) of the information processing terminal through an application transmitter (102). The application receiver (302) starts the terminal application (31). An application authenticator (311) of the terminal application (31) performs an authentication with the secure device (10) by means of the application authentication information.

23 Claims, 28 Drawing Sheets

(56) References Cited

U.S. PATENT DOCUMENTS

| | | | |
|---|---|---|---|
| 6,006,328 A * | 12/1999 | Drake | 726/23 |
| 6,163,842 A * | 12/2000 | Barton | 713/176 |
| 6,289,455 B1 * | 9/2001 | Kocher et al. | 713/194 |
| 6,351,817 B1 * | 2/2002 | Flyntz | 726/4 |
| 6,609,199 B1 * | 8/2003 | DeTreville | 713/172 |
| 6,857,067 B2 * | 2/2005 | Edelman | 713/155 |
| 7,096,204 B1 * | 8/2006 | Chen et al. | 705/74 |
| 7,127,605 B1 * | 10/2006 | Montgomery et al. | 713/150 |
| 2002/0040936 A1 * | 4/2002 | Wentker et al. | 235/492 |
| 2002/0178371 A1 * | 11/2002 | Kaminaga et al. | 713/189 |
| 2003/0163694 A1 * | 8/2003 | Chen et al. | 713/170 |
| 2005/0218234 A1 * | 10/2005 | Girard et al. | 235/492 |

FOREIGN PATENT DOCUMENTS

| | | |
|---|---|---|
| JP | 2003-141457 | 5/2003 |
| TW | 476909 | 6/1989 |
| TW | 541486 | 7/1990 |
| TW | 347498 | 9/1997 |
| WO | 98/33296 A1 | 7/1998 |

* cited by examiner

```
# App. name, session key, valid until
ap1, 0xebabefac, 2003/03/31 07:00:05
ap2, 0x213ecafe, 2003/03/31 07:00:10
```

SPECIFIC EXAMPLE OF ISSUE INFORMATION

FIG.6

```
put s1,s2,s3,s4,s5,s6 = random
choose a,b,c from s1,s2,s3,s4,s5 by s6
calc (a << 13) ^ (b << 7) ^ c
```

SPECIFIC EXAMPLE OF DUMMY-CONTAINING
INSTRUCTION TEMPLATE

FIG.7A

```
put 0x37,0x47,0x57,0x67,0x77,0x87 = random
choose %7,%8,%9 from %1,%2,%3,%4,%5 by %6
calc (%7 << 13) ^ (%8 << 7) ^ %9
```

SPECIFIC EXAMPLE OF DUMMY-CONTAINING
INSTRUCTION

FIG.7B

```
put s[256] = random
calc invoke java keycalc.class s
```

INSTRUCTION TEMPLATE WHERE CARD
APPLICATION IS USED IN CALCULATION

FIG.8A

```
put 0x37 - 0x136 = random
calc invoke java keycalc.class 0x37
```

INSTRUCTION WHERE CARD APPLICATION
IS USED IN CALCULATION

FIG.8B

```
# App. name, encrypt key, hash
ap1, 0xeface321, 0x7ae9a3ca
ap2, 0xac3a9ea7, 0x123ecafe
```

SPECIFIC EXAMPLE OF DATA STORED IN
APPLICATION ENCRYPTION KEY STORAGE

FIG.16

```
put s1,s2,s3,s4,s5 = random
put dm1,dm2 = dynamic_method
choose a,b,c from s1,s2,s3,s4 dm1 by s5
calc (a << 13) ^ (b << 7) ^ c ^ dm2
```

SPECIFIC EXAMPLE OF INSTRUCTION TEMPLATE

FIG.19A

```
put 0x37,0x47,0x57,0x67,0x77,0x87 = random
put [0x135,0x100],[0x33f,0x80] = dynamic_method
choose ,%8,%9,%10 from %1,%2,%3,%4,by %5
calc (%8 << 13) ^ (%9 << 7) ^ %10 ^ %7
```

SPECIFIC EXAMPLE OF INSTRUCTION

FIG.19B

```
put s1,s2,s3,s4,s5,s6 = random
choose a,b,c from s1,s2,s3,s4,s5 by s6
calc (a << 13) ^ (b << 7) ^ c
methods scramble
```

SPECIFIC EXAMPLE OF INSTRUCTION TEMPLATE

FIG.21A

```
put 0x37,0x47,0x57,0x67,0x77,0x87 = random
choose %7,%8,%9 from %1,%2,%3,%4,%5 by %6
calc (%8 << 13) ^ (%9 << 7) ^ %9
methods scramble [0x100,0x180], [0x280,0x80],
                 [0x300,0x100], [0x400,0x100]
```

SPECIFIC EXAMPLE OF INSTRUCTION

FIG.21B

SECURE DEVICE, INFORMATION PROCESSING TERMINAL, INTEGRATED CIRCUIT, TERMINAL APPLICATION GENERATION APPARATUS, APPLICATION AUTHENTICATION METHOD

BACKGROUND OF THE INVENTION

1. Field of the Invention

The present invention relates to a secure device for holding data securely such as a JAVA® card, and an information processing terminal in which the secure device is mounted, such as a mobile telephone, PDA (Personal Digital Assistant), and personal computer.

2. Description of Related Art

In the recent years, secure devices having a CPU and a tamper-resistant memory field, such as JAVA® cards are capable of operating card applications, and are used in various services including electronic money, commuter passes, and electronic tickets. By installing such a secure device in an information processing terminal such as a mobile telephone, using the keyboard or the display of this information processing terminal as a user interface to the secure device, and transmitting data to be written in the secure device or data read from the secure device on a network using the communication functions of the information processing terminal, various services can be implemented. Upon implementation of such services, terminal applications that govern the operation of the information processing terminal operate on the information processing terminal.

The information processing terminal obtains these terminal applications such as by loading them from the service provider via a network.

For example, Unexamined Japanese Patent Publication No. 2003-141457 discloses an information processing terminal that loads, from a service provider, a terminal application for displaying value information held in a secure device such as electronic money and electronic tickets offline.

However, conventional methods such as above have a problem that a secure device is unable to tell the authenticity of a terminal application that starts on the information processing terminal and accesses the secure device. This allows a user that has the right authenticity information to use a false terminal application and gain access to the information in the secure device and use services without being subject to regulations upon the true terminal application.

SUMMARY OF THE INVENTION

It is therefore an object of the present invention to authenticate a terminal application.

According to one aspect of the present invention, a secure device stores an application to be processed by an information processing terminal, and employs a configuration an application issuer that embeds, in the application, information for an authentication of the application, and issues this application to the information processing terminal.

According to another aspect of the present invention, an information processing terminal employs a configuration having: an application issue request transmitter that, upon starting an application, requests a secure device to issue the application with authentication information embedded in the application; an application receiver that receives the application issued by the secure device with authentication information embedded in the application; and an application executor that executes the application, and, in this information processing terminal, when the application executor starts and executes the application, the application and the secure device perform an authentication of the application using the authentication information.

According to yet another aspect of the present invention, an information processing terminal employs a configuration having: an application issue request transmitter that requests issue of an application; a receiver that receives an application issued by a secure device; and an application executor that executes the application, and, in this information processing terminal, the application issue request transmitter requests issue of an MTA (Master Trusted Agent) that has a function to substitute part of processing of the secure device to the secure device and receives the MTA issued by the secure device, and the application executor starts and performs an authentication between the secure device and the MTA using the authentication information embedded in the MTA; and subsequently, the application issue request transmitter requests the MTA to issue a non-MTA application, the MTA requests the secure device to issue the non-MTA application, receives and starts the non-MTA application issued by the secure device, and performs an authentication between the secure device and the non-MTA application using authentication information embedded in the non-MTA application.

According to yet another aspect of the present invention, an information processing terminal employs a configuration having: an encrypted application storage that stores an encrypted application, the encrypted application being decodable by means of an application encryption key stored in a secure device; an application issue request transmitter that requests issue of the application; and an application executor that executes the application, and, in this information processing terminal, the application issue request transmitter requests issue of an MTA that has a function to substitute part of processing of the secure device to the secure device and receives the MTA issued by the secure device, and the application executor starts and performs an authentication between the secure device and the MTA using the authentication information embedded in the MTA, and, subsequently, the application issue request transmitter requests the MTA to issue a non-MTA application, and the MTA requests an application encryption key from the secure device, receives the application encryption key from the secure device, and decodes and executes the encrypted application stored in the encrypted application storage. 26According to a still further aspect of the invention, According to yet another aspect of the present invention, a terminal application generation apparatus generates an application to be processed by an information processing terminal and has a secure device store the application, and the terminal application generation apparatus employs a configuration having: an embedment preparator that receives a source code of the application, prepares for an embedment of authentication information, and outputs the source code, in which the authentication information can be embedded, and an instruction template that comprises a prototype of an instruction specifying a method of the embedment of the authentication information; a complier that compiles the source code, in which the authentication information can be embedded, into a bytecode (object code) that is executable on the information processing terminal; and an instruction generator that receives the bytecode and the instruction template and generates the instruction, and, in this terminal application generation apparatus, the bytecode and instruction are transmitted to and stored in the secure device.

According to yet another aspect of the present invention, an application authentication method has the steps of: having a secure device store an application that operates on an information processing terminal; having the secure device generate authentication information in response to an application issue request from the information processing terminal, embed the authentication information in the application, and transmit the application to the information processing terminal; having the information processing terminal start the application and perform an authentication of the application with the secure device using the authentication information; and having the secure device authenticate the application.

According to yet another aspect of the present invention, an integrated circuit in an information processing terminal employs a configuration having: an application executor that executes an application on the information processing terminal; an application issue request transmitter that, upon starting the application, requests a secure device to issue the application with authentication information embedded in the application; and an application receiver that receives the application issued by the secure device with authentication information embedded in the application, and, in this integrated circuit, upon execution of the application, an authentication of the application is performed with the secure device using the authentication information.

According to yet another aspect of the present invention, an integrated circuit in an information processing terminal employs a configuration having: an application executor that executes an application on the information processing terminal; an application issue request transmitter that requests issue of the application; and an application receiver that receives the application issued by the secure device, and, in this integrated circuit, the application issue request transmitter requests issue of an MTA Master Trusted Agent that has a function to substitute part of processing of the secure device to the secure device, receives and starts the MTA issued by the secure device, and performs an authentication of the MTA with the secure device using the authentication information embedded in the MTA, and, subsequently, the application issue request transmitter requests the MTA to issue a non-MTA application, the MTA requests the secure device to issue the non-MTA application, receives and starts the non-MTA application issued by the secure device, and performs an authentication with the secure device using authentication information embedded in the non-MTA application.

According to yet another aspect of the present invention, an integrated circuit in an information processing terminal employs a configuration having: an application executor that executes an application on an information processing terminal; an application issue request transmitter that request issue of the application, and, in this integrated circuit, the application issue request transmitter requests issue of an MTA (Master Trusted Agent) that has a function to substitute part of processing of a secure device to the secure device, receives and starts the MTA issued by the secure device, and performs an authentication of the MTA with the secure device using the authentication information embedded in the MTA; and, subsequently, the application issue request transmitter requests the MTA to issue a non-MTA application, and the MTA requests an application encryption key from the secure device, receives the application encryption key from the secure device, and decodes and executes an encrypted application.

BRIEF DESCRIPTION OF THE DRAWINGS

The above and other objects and features of the invention will appear more fully hereinafter from a consideration of the following description taken in connection with the accompanying drawings wherein examples are illustrated by way of example, in which:

FIG. 6 shows a specific example of issue information;

FIG. 7A shows a specific example of a dummy-containing instruction template;

FIG. 7B shows a specific example of a dummy-containing instruction;

FIG. 8A shows a specific example of an instruction template where calculation is performed by means of a card application; FIG. 8 FIG. 8B shows a specific example of an instruction where calculation is performed by means of a card application;

FIG. 16 shows a specific example of data stored in an application encryption key storage;

FIG. 19A shows a specific example of an instruction template;

FIG. 19B shows a specific example of an instruction;

FIG. 21A shows a specific example of an instruction template;

FIG. 21B shows a specific example of an instruction;

DESCRIPTION OF THE PREFERRED EMBODIMENT

Embodiments of the present invention will be described below with reference to the accompanying drawings.

Embodiment 1

Embodiment 1 of the present invention will describe a secure device holding a terminal application. When this secure device is mounted in an information processing terminal and this information processing terminal requests start of a terminal application, the secure device will issue the terminal application with application authentication information embedded therein, to the information processing terminal. When the information processing terminal starts the terminal application, an authentication will be performed between the secure device and the information processing terminal by means of the application authentication information.

Figure 1:
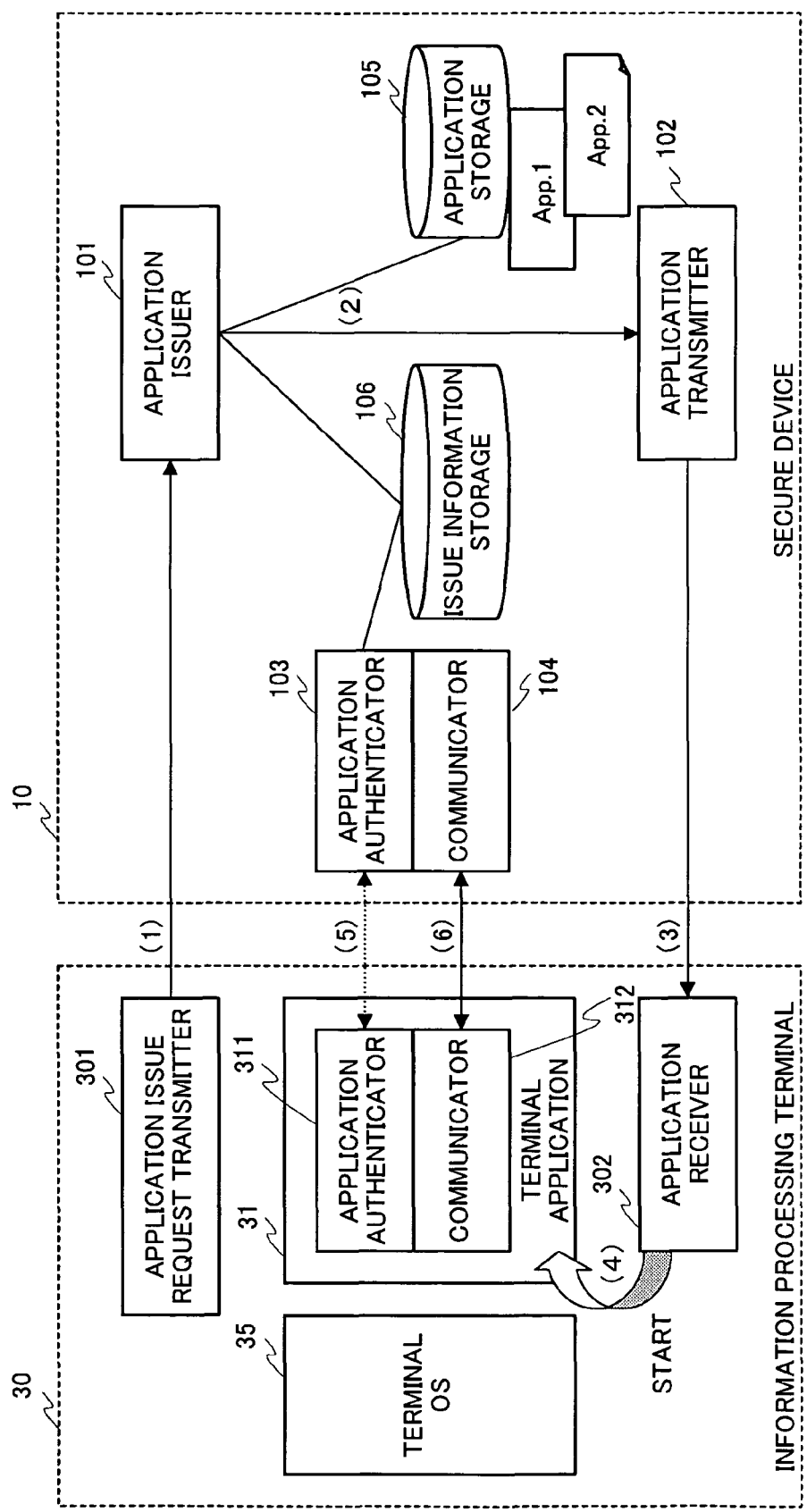
FIG. 1 is a functional block diagram of information processing terminal 30 and secure device 10 according to Embodiment 1 of the present invention.

Referring to FIG. 1, information processing terminal 30 has terminal OS 35, application issue request transmitter 301 that requests issue of terminal application 31, and application receiver 302 that receives issued terminal application 31. Moreover, terminal application 31 to start has application authenticator 311 that performs authentication with secure device 10 based on the application authentication information embedded in terminal application 31, and communicator 312 that communicates with card application 11 on secure device 10 (see FIG. 2A). Incidentally, information processing terminal 30 is provided with a storage means for holding terminal application 31 such as a memory and a HDD. Information processing terminal 30 is furthermore provided with a CPU, a memory, or the equivalent for executing terminal application 31. These elements, however, will not be mentioned or shown in the following descriptions of the embodiment and drawings, and the same will apply to the other embodiments.

Furthermore, FIG. 1 shows that information processing terminal 30 is provided with terminal application 31. This means that information processing terminal 30 receives and stores terminal application 31 issued by secure device 10 in a memory. This will apply to the other embodiments as well, except for Embodiment 3, which, as will be later described, encrypts and stores terminal application 31 in information processing terminal 30 (see FIG. 12 and FIG. 13).

On the other hand, secure device 10 has application issuer 101 that embeds application authentication information in terminal application 31 and issues terminal application 31, application transmitter 102 that transmits issued terminal application 31, application authenticator 103 that authenticates issued terminal application 31 based on the embedded application authentication information, communicator 104 that communicates with terminal application 31 on information processing terminal 30, application storage 105 that holds authenticated terminal application 31, and issue information storage 106 that stores the application authentication information embedded in terminal application 31 upon issue. Secure device 10 is also provided with an MPU, memory, and the equivalent, for implementing card application 11 and issue application 12. These elements, however, will not be mentioned or shown in the following descriptions and drawings, and the same will apply to the other embodiments. In addition, in this figure, the numbers in parentheses indicate the order of operation. The same will apply to all the drawings.

Next, the operations in FIG. 1 will be described. Upon request for start of terminal application 31 from the user, application issue request transmitter 301 of information processing terminal 30 transmits a request for issue of terminal application 31 to application issuer 101 of secure device 10 ((1) in FIG. 1). Application issuer 101 reads terminal application 31 from application storage 105, performs issue processing including embedding application authentication information, which is generated on a random basis upon every issue of terminal application 31, associates issue-related information including an application ID (i.e. application identifier) of terminal application 31 and the embedded application authentication information and saves these in issue information storage 106, and passes issued terminal application 31 to application transmitter 102 ((2) in FIG. 1). Application transmitter 102 transmits issued terminal application 31 to application receiver 302 of information processing terminal 30 ((3) in FIG. 1). Application receiver 302 receives and starts issued terminal application 31 ((4) in FIG. 1). Application authenticator 311 of terminal application 31 performs authentication processing with application authenticator 103 of secure device 10 based on the embedded application authentication information ((5) in FIG. 1). Thereupon, as will be later described, a key is produced based on the application authentication information (hereinafter application authentication key) and terminal application 31 is authenticated. After terminal application 31 is authenticated, communicator 312 of terminal application 31 and communicator 104 of secure device 10 will perform communication using a key produced apart from the key shared and used in the authentication processing, that is, the application authentication key ((6) in FIG. 1). By this means, confidential information stored in secure device 10 including important data and valuable data is given only to terminal application 31 that has been authenticated by means of the application authentication key, so that it is possible to protect the confidential information. In addition, the application authentication key is used only upon authentication, and communication after that will be performed sharing another newly produced key, so that the authentication processing and communication processing will make use of different keys and authentication and communication become independent of one another, thereby more certainly blocking leaks of authentication keys and keys used in communication.

Figure 2B:
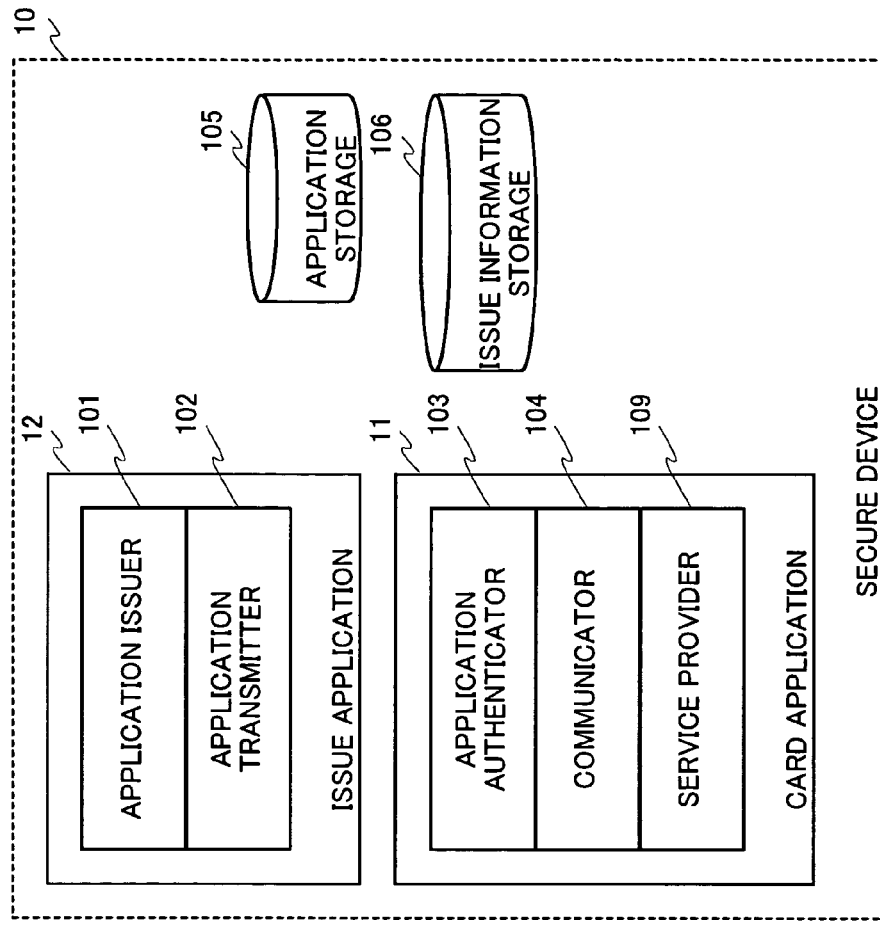
FIG. 2B is a configuration diagram of the information processing terminal of FIG. 1.
Figure 2A:
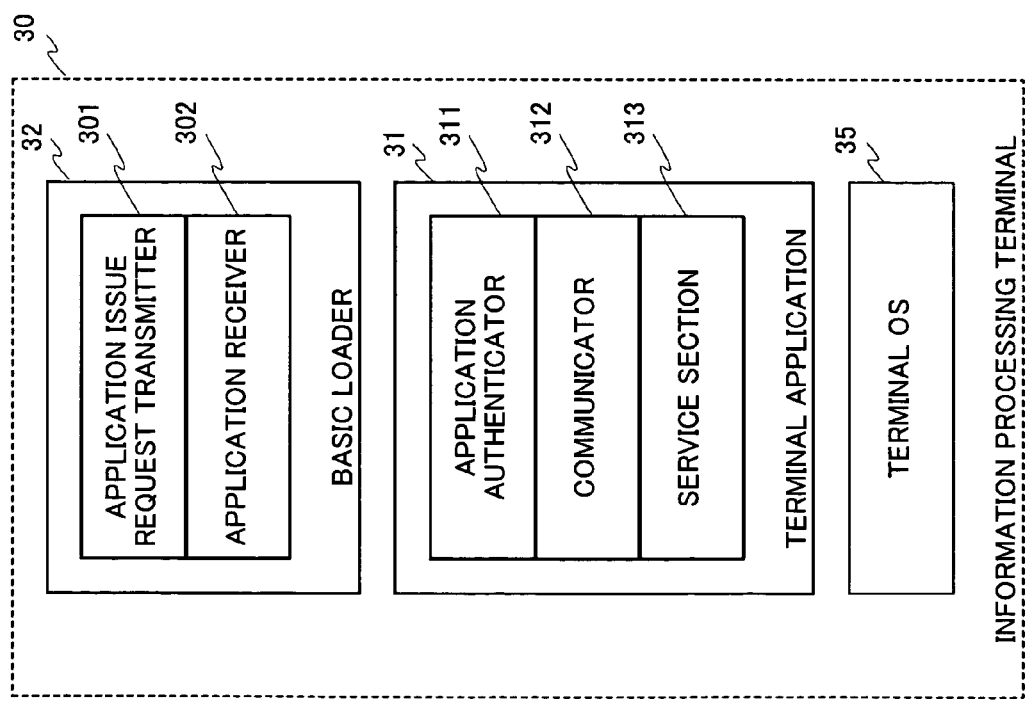
FIG. 2A is a configuration diagram of the secure device of FIG. 1.

FIG. 2A and FIG. 2B are configuration diagrams, showing configurations for implementing the function blocks of information processing terminal 30 and secure device 10 of Embodiment 1, respectively.

In information processing terminal 30, application authenticator 311, communicator 312, and service section 313 that receives services and that displays information to the user and accepts input are implemented by means of terminal application 31. Application issue request transmitter 301 and application receiver 302 ask for issue of terminal application 31 stored in secure device 10 and are implemented by means basic loader 32, which is an application for starting.

In secure device 10, application issuer 101 and application transmitter 102 are implemented by issue application 12. Application authenticator 103, communicator 104, and service provider 109 that provides services, are implemented by means of card application 11. Application storage 105 and issue information storage 106 are memory fields on secure device 10 that are tamper-resistant and are therefore difficult to access directly from the outside, and are implemented by, for example, a EEPROM and a flash memory in secure device 10.

Figure 3:
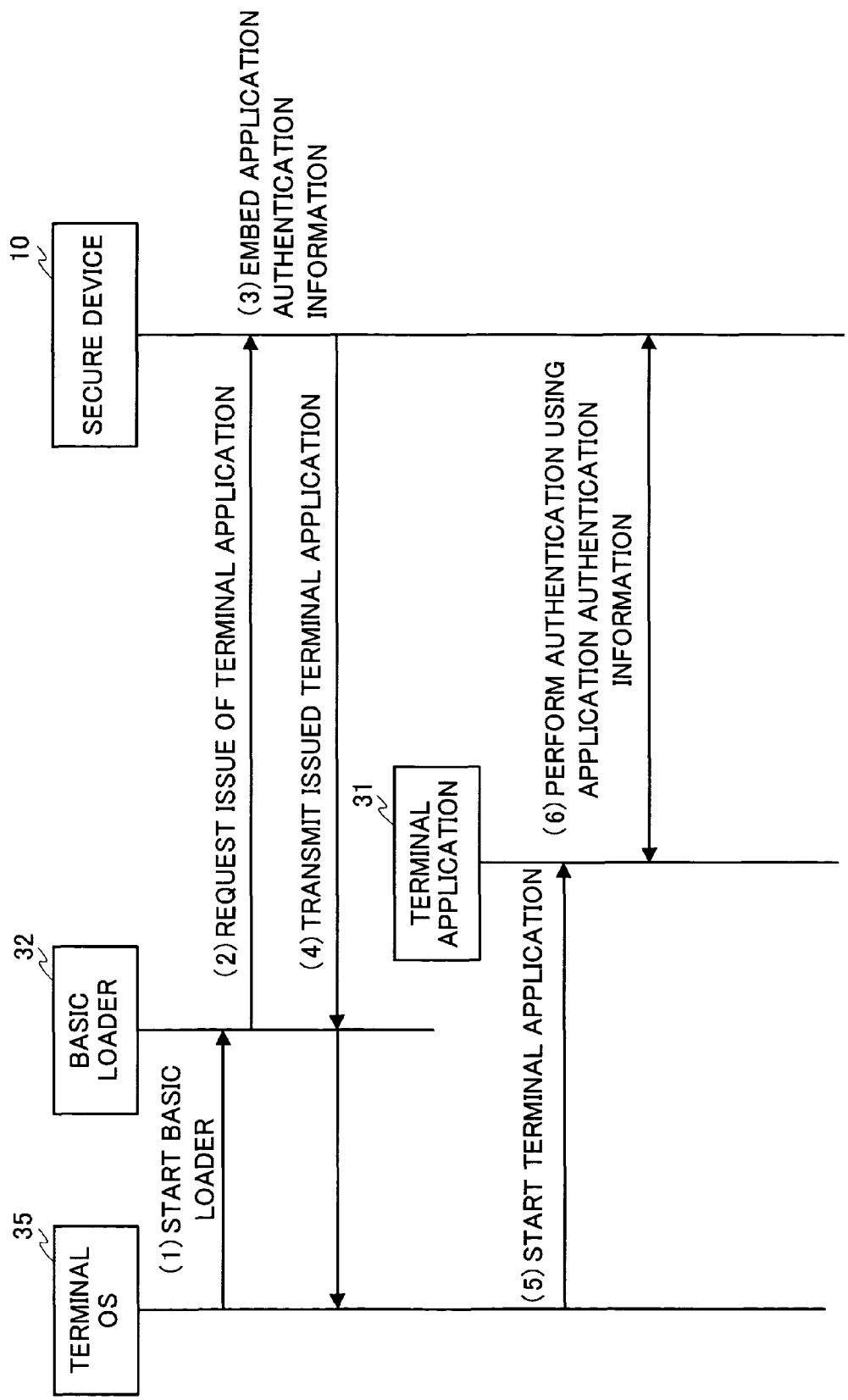
FIG. 3 is a sequence diagram of Embodiment 1 of the present invention.

The sequence diagram of FIG. 3 shows the steps of processing by this secure device 10 and information processing terminal 30.

Terminal OS 35 starts basic loader 32 upon request from the user of information processing terminal 30 and upon detection of insertion of secure device 10 in information processing terminal 30 ((1) in FIG. 3). Basic loader transmits the application ID that specifies terminal application to be started to issue application 12 of secure device 10 ((2) in FIG. 3).

In secure device 10, issue application 12 embeds application authentication information in terminal application 31 specified by basic loader 32 by the application ID ((3) in FIG. 3), and issues this terminal application 31 to basic loader 32 of information processing terminal 30 ((4) in FIG. 3).

Upon receiving terminal application 31, basic loader 32 starts received terminal application 31 on terminal OS 35 ((5) in FIG. 3). Terminal application 31 uses the embedded application authentication information and performs an authentication with card application 11 of secure device 11 ((6) in FIG. 3).

Figure 4:
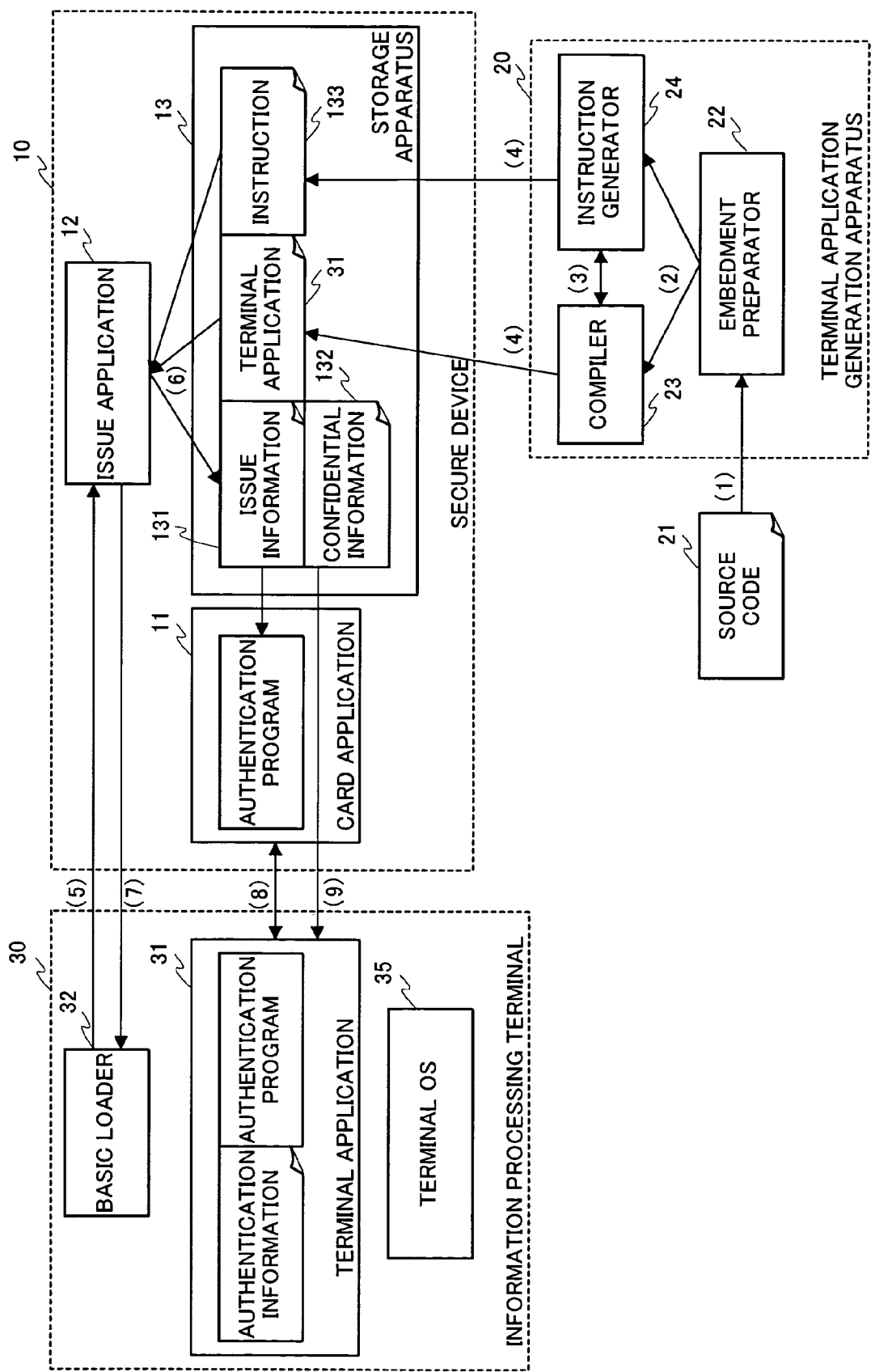
FIG. 4 illustrates in detail the system of Embodiment 1 of the present invention.

FIG. 4 shows an overview of the system operation including generation of terminal application 31, loading of terminal application 31 to secure device 10, and authentication between terminal application 31 on information processing terminal 30 and secure device 10. Incidentally, referring to secure device 10 in FIG. 4, application storage 105 and issue information storage 106 in FIG. 1 are shown as one storage apparatus 13 that stores issue information 131, confidential information 132, terminal application 31, and instruction 133.

In addition, referring to FIG. 4, terminal application generation apparatus 20 is constituted with a computer or the equivalent on which software is installed that converts source code 21 into a terminal application in which application authentication information can be embedded, and has embedment preparator 22, compiler 23, and instruction generator 24.

In the following descriptions, the application authentication key is calculated upon implementation based on the application authentication information embedded in terminal application 31, and authentication is performed using this application authentication key. In particular, making the source codes, especially the source code pertaining to calculation of the application authentication key and authentication difficult to read would be effective. The system of FIG. 4 starts from where terminal application 31 is developed as usual and source code 21 written in JAVA® or equivalent language is acquired.

The flow includes the operations of (1) through (4) in FIG. 4, in which terminal application generation apparatus 20 generates terminal application 31, in which application authentication information can be embedded, and instruction 133, which specifies the method of embedding the application authentication information, and stores these in secure device 10, and the operations of (5) through (9) in FIG. 4, in which secure device 10 issues terminal application 31 and authentication processing is completed.

Next, the operation in FIG. 4 will be described. Embedment preparator 22 of terminal application generation apparatus 20 receives source code 21 of a developed terminal application ((1) in FIG. 4), and performs embedment preparation. To be more specific, embedment preparator 22 adds to received source code 21, room to embed application authentication information in, and source code for acquiring an application authentication key from the embedded application authentication information and performing authentication processing with secure device 10. In addition, embedment preparator 22 generates an instruction template, which refers to a prototype of instruction 133 that specifies the method of embedment suitable to the added source code and the use method thereof ((2) in FIG. 4).

The source code of this terminal application 31 prepared for embodiment is compiled by compiler 23 and output to instruction generator 24 in the form of bytecode (i.e. object code) ((3) in FIG. 4).

Next, instruction generator 24 generates instruction 133 from the bytecode of terminal application 31 from compiler 23 and the instruction template from embedment preparator 22, and compiler 23 and instruction generator 24 store the bytecode of terminal application 31 and instruction 133 in storage apparatus 13 of secure device 10 ((4) in FIG. 4).

Figure 5:
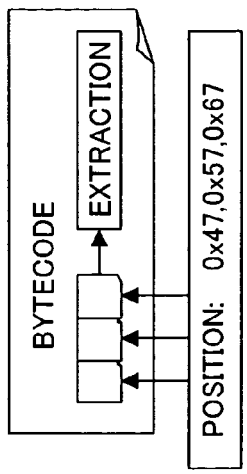
FIG. 5A shows a specific example of an instruction template.
FIG. 5B shows a specific example of an instruction.
FIG. 5C explains the meaning of the numerals in an instruction.

When the user performs start operation on information processing terminal 30 and requests start of terminal application 31, basic loader 32 will start and tell the application ID of terminal application 31 to be started to issue application 12 of secure device 10, and requests issue of terminal application 31 to be started ((5) in FIG. 5). This corresponds to the operation of (1) in FIG. 1. User authentication and license authentication of terminal application 31 to be started may be performed at this time.

Issue application 12 in secure device 10 reads terminal application 31 and instruction 133 from storage apparatus 13, and, with reference to instruction 133, embeds application authentication information (which contains randoms and formulas for calculating the randoms, the values of which change every time) in the bytecode of terminal application 31. Then, issue application 12 calculates an application authentication key from the application authentication information embedded in terminal application 31, and associates it with the application ID and stores them as issue information 31 ((6) in FIG. 4). This corresponds to the operation of (2) in FIG. 1. Regarding the application authentication key, the same application authentication key is calculated as the one terminal application 31 upon information processing terminal 30 actually calculates.

When terminal application 31 issued by issue application 12 is passed to basic loader 32 of information processing terminal 30, terminal application 31 will start on information processing terminal 30 ((7) in FIG. 4) This corresponds to the operations of (3) and (4) in FIG. 1.

Terminal application 31 calculates the application authentication key based on the application authentication information embedded in terminal application 31 and the code added to source code 21 of terminal application 31 by embedment preparator 22 of terminal application generation apparatus 20 for performing authentication processing with secure device 10, and performs authentication processing with card application 11 of secure device 10 by an authentication program ((8) in FIG. 4) This corresponds to the operation of (5) in FIG. 1.

If as a result of the authentication processing terminal application 31 issued by information processing terminal 30 is authenticated, and a request for reading confidential information 132 comes from authenticated terminal application 31 in information processing terminal 30, communicator 104 of card application 11 will read confidential information 132 from storage apparatus 13 and, communicating with terminal application 31 of information processing terminal 30 sharing a key apart from the application authentication key, passes confidential information 132 to terminal application 31 of information processing terminal 30 through communication ((9) in FIG. 4). This corresponds to the operation of (6) in FIG. 1. A request from unauthenticated terminal application 31 in information processing terminal 30 will not be responded.

The operations in FIG. 4 will be described below in detail using sample data with reference to FIG. 5-FIG. 8.

Referring to FIG. 4, in the operation of (2) by terminal application generation apparatus 20, embedment preparation is performed.

As a specific example of embedment, a method will be explained below whereby application authentication information to be embedded is substituted into variables and the application authentication key is calculated based on these variables. Embedment preparator 22 prepares the variables in which application authentication information to be embedded in source code 21 is put, and adds code for calculating the application authentication key using these variables.

Depending on the method of embedment, it may be necessary to have compiler 23 output debug information and use it in generation of an instruction from an instruction template— that is, the significance of the compilation method increases. For example, when variables that are substituted as local variables are prepared, information about the local variables is necessary to generate instruction 133, and yet, usually, compiler 23 does not leave information about local variables in the bytecode. If debug information is output, this will leave local variable information, which will make it possible to generate instruction 133. If debug information is left as it is, this can be a clue for analysis, and, since debug information is output as part of the bytecode, after generation of instruction, care must be taken not to leave unnecessary information in the bytecode such as by removing debug information from the bytecode.

When the source code is obfuscated, depending on the method of obfuscation, it may be necessary to obtain information from obfuscation software. For example, if obfuscation is performed such that symbol names are turned devoid of meaning, correspondence with the original names must be known.

FIG. 5A shows a specific example of the operation of (2) in FIG. 4, that is, an example of an instruction template generated by embedment preparator 22 of terminal application generation apparatus 20.

The first line indicates the location in terminal application 31 for embedding application authentication information in and information that is embedded as the application authentication information. Variable names s1, s2, and s3 indicate variables in the code, and this line means that randoms are put in s1, s2, and s3. These s1, s2, and s3 are provided in the code during embedment preparation. Although the present example is based on the premise of putting 32-bit integer values, depending on the language, if necessary, it is possible to explicitly indicate the type and range of values.

The second line indicates the method of obtaining an application authentication key from embedded application authentication information. In this case, it means to calculate the exclusive logical sum of the embedded variables.

FIG. 5B shows a specific example of the operation of (4) in FIG. 4, that is, an example of instruction 133 that corresponds to the above-described instruction template generated by instruction generator 24 of terminal application generation apparatus 20.

At the positions of s1, s2, and s3 calculated in the bytecode through compilation, s1, s2, and s3 are replaced. As simplified and shown as FIG. 5C, 0x47, 0x57, and 0x67 are the number of bytes from the top of the locations of s1, s2, and s3, respectively in hexadecimal notation. For example, 0x47 means that s1 is the 71st byte in the bytecode in decimal notation. The variable names are replaced with %1, %2, and %3, respectively.

After generation, the bytecode and instruction are stored in storage apparatus 13 of secure device 10, and the following are some of the things to be careful about.

When the bytecode and instruction 133 are passed to secure device 10, they need to be passed in form that enables authentication and tamper detection. For example, a certificate may be attached in which the hash value of the data to be passed is given an electronic signature by means of a secret key of the terminal application generation apparatus. Secure device 10 has a public key certificate of the generation apparatus so as to be able to verify the certificate, and verifies and stores the received data.

Moreover, to prevent terminal applications and instructions from being intercepted and to prevent impersonification, terminal application generation apparatus 20 or a server that receives and distributes instructions and terminal applications from terminal application generation apparatus 20, employs mutual-authentication upon transmission to secure device 10, so as to establish a secure communication path, and transmits encrypted data. In secure device 10, issue application 12 receives, examines, and stores.

Referring to the operation of (5) in FIG. 4, basic loader 32 transmits the application ID of terminal application 31 to issue application 12 and make an issue request.

At this time, it is equally possible to transmit information such as about the model (number) and free memory of information processing terminal 30, and have issue application 12 select terminal application 31 to issue using such additionally transmitted information besides the application ID. For example, to provide the same service, secure device 10 can hold a model A version and a model B version, or secure device 10 can hold a multi-functional application that requires large memory and a simple application that requires less memory, and selects terminal application 31 to issue depending on information processing terminal 30.

In the operation of (6) in FIG. 4, issue application 12 makes reference to instruction 133 and embeds application authentication information in the bytecode of terminal application 31.

As for instruction 133 of terminal application 31 to be issued, for example, issue application 12 having received instruction 133 shown as FIG. 5B follows the first line of this instruction 133 and embeds randoms in the positions of 0x47, 0x57, 0x67 in the bytecode of terminal application 31, and stores these as the first to third variables (%1,%2,%3), respectively. Later, following the second line, issue application 12 calculates the exclusive logical sum of them and makes the result an application authentication key.

Here issue application 12 is able to receive the bytecode of terminal application 31 and an instruction template, and, like instruction generator 24, generate and embed instruction 133. This, however, involves complex processing. Besides, it is not efficient for issue application 12 on secure device 10 to do it upon every issue. Consequently, once instruction 133 is generated, it can be used later again, so that generating one in advance such as by terminal application generation apparatus 20 shown in FIG. 4 would be more efficient. In addition, more complex processing may require help of complier 23, and applying obfuscation may require a grater amount of data to generate instruction 133. In consideration of these, it is preferable not to make instruction 133 inside secure device 10 but make instruction 133 in advance outside secure device 10 (for example, in terminal application generation apparatus 20).

In the operation of (8) in FIG. 4, card application 11 performs authentication processing of terminal application 31.

Like the content of instruction in instruction 133, terminal application 31 is programmed to make the application authentication key from the exclusive logical sum of three random numbers embedded, which are application authentication information. Card application 11 acquires the application authentication key from issue information 131 stored in storage apparatus 13. Authentication methods by means of application authentication keys can employ symmetric key schemes. For example, a challenge-response system may be used. Furthermore, if there is no need of mutual-authentication, it is possible to handle an application authentication key as a one-time password and transmit it to the secure device. In addition, upon authentication, it is desirable to share a new key for use for later communications.

When saving an application authentication key as part of issue information 131, issue application 12 may set an expiration term on the application authentication key. That is, this expiration date will be examined when authentication processing is performed by application authenticator 103 of card application 11. To be more specific, application authenticator 103 measures the time passed since the issue of terminal application 31 by application issuer 101, and, if the time is within the expiration term, the application authentication key will be valid and the authentication can be performed, while, if time passes beyond the expiration term, the application authentication key will be invalid and the authentication cannot be performed. In addition, the application authentication key will be used only upon the first authentication, and additional keys for use in later communications will be shared. Consequently, a period of time will be enough during which loading of the terminal application to information processing terminal 30 can be completed and the authentication by means of the application authentication key can be completed. If an unnecessarily long period of time is set, there will be a threat of having an issued terminal application analyzed, resulting in leaks of the application authentication key and allowing possible attacks including impersonification. For this reason, the term needs to be set short. By thus setting a term of expiration that is valid just long enough for performing an authentication on the application authentication key, even when there is an illegal attempt to analyze terminal application 31 and impersonify terminal application 31, the term of the application authentication key will expire while the analysis of the authentication information consumes extra time, so that it is possible to defend to the system from this illegal attack by way of impersonifying the terminal application and detect that there has been an attempted attack.

FIG. 6 shows an example of issue information 131. The Application ID, the application authentication key, and the expiration of the application authentication key are written. For example, the second line indicates that terminal application 31 having the application ID of ap1 has an application authentication key of "0xebabefac" (in hexadecimal notation) and an expiration term of 2003/03/31 07:00:05. If multiple card applications 11 are installed for the purpose of providing several different services with one secure device 10, terminal application 31 will need to be able to identify with which card application 11 it needs to communicate. It is therefore convenient to specify identification information of each card application 11 when terminal application 31 is developed. Identification information of card application 11 may not be disclosed to the developer. In such case, when issue application 12 receives and stores identification information of card application 11 from the server, issue application 12 receives instructions in the same way as embedment, and writes it in the terminal application. In addition, if the identification information of card application 11 can be made dynamic, it is equally possible to have issue application 12 embed identification information of card application 11 upon issue.

Moreover, it is also effective to program terminal application 31 such that, when terminal application 31 is executed and finished in information processing terminal 30, all the information that is acquired from secure device 10 and that is not intended to be stored in information processing terminal 30 (for example, issue information 131 including the application authentication key, the identification information of card application 11, and confidential information 132) will be erased from the storage field including memory. By this means, even when information that is not intended to be stored in information processing terminal 30 is passed to information processing terminal 30, it will definitely be erased when the execution of terminal application 31 is finished so that leaks can be prevented.

Next, the methods of embedding application authentication information and the variations of corresponding instructions 133 will be explained.

FIG. 7 is an example of putting dummy data that is not used in calculation of authentication information to be embedded in terminal application 31. FIG. 7A is an example of an instruction template with dummy. The first line means that six randoms from s1 to s6 are embedded in terminal application 31 as application authentication information. The second line means that three of s1 to s5 are chosen by the value of s6 and are made a, b, and c, respectively. That is, of the six randoms, two are dummy data. The method of choosing is to pick up three of s1 to s5 and arrange them in all possible patterns (referred to as all permutations. The present example allows 60 possible patterns), number them, and assign the permutation corresponding to the remainder of s6 divided by the number of all permutations (60 in the present case) to a, b, and c. The third line means that an application authentication key is calculated using a, b, c that are assigned. FIG. 7B is an example of instruction 133 generated from the dummy-containing instruction template shown in FIG. 7A. Similar to the case of FIG. 5B, the location of embedment is calculated and the variable names are replaced with 7 or such. Like the content of instruction in instruction 133, terminal application 31 is programmed to pick three of the six random numbers embedded, which are application authentication information, and make the application authentication key from the exclusive logical sum.

As describe above, by putting dummy data in accordance with the dummy-containing instruction template and dummy-containing instruction 133, for example, even when the application authentication information embedded in terminal application 31 is extracted from outside through comparison of several issued terminal applications 31, it is possible to make it more difficult to guess the application authentication key. As a result, it is possible to improve tamper-resistance against differential attacks.

Thus, according to Embodiment 1, when information processing terminal 30 mounted with secure device 10 that accommodates terminal application 31 requests start of terminal application 31, secure device 10 will embed application authentication information in terminal application 31 and issues terminal application 31 to information processing terminal 30, so that, when information processing terminal 30 starts terminal application 31, secure device 10 and information processing terminal 30 will be able to perform an authentication based on the application authentication information.

Incidentally, although a case has been described with the present embodiment where application authentication information that has different values upon every issue of terminal application 31 is embedded into terminal application 31 as authentication information in accordance with instruction 133, the present invention is by no means limited to this, and it is equally possible to use identification information of card application 11 that cannot be recognized unless it is sent from secure device 10 or other information of choice. Examples include the parameters based on which secure device 10 regulates the operation of terminal application 31, and license information. Instruction 133 can be used for the purpose of embedding such information.

Moreover, although a case has been described with the present embodiment where issue application 12 calculates the application authentication key based on application authentication information and stores it as part of issue information in issue information storage 106, the present invention is by no means limited to this, and it is equally possible to provide program code for calculating the application authenticator key from application authentication information within card application 11, and have application authenticator 103 of card application 11 read the application authentication information made by issue application 12 upon authentication and calculate the application authentication key. In this case, no method of calculating the application authentication key needs to be written in instruction 133 that issue application 12 receives, and so not even issue application 12 will find out the application authentication key and authentication becomes independent, thereby more certainly blocking leaks of authentication keys.

FIG. 8 is an example of case where card application 11 is used in calculating the application authentication key from application authentication information. FIG. 8A shows an example of an instruction template. The first line means that 256 items of application authentication information are embedded. In this case, these are embedded in a sequence. The second line means that the embedded application authentication information is passed to card application 11 as randoms, and card application 11 calculates the application authentication key from the embedded application authentication information, and makes the application authentication key from the returned result. FIG. 8B is an example of instruction 133 generated from instruction template. Similar to the case of FIG. 5, the location of embedment is calculated and the variable names are replaced with 0x37 or such.

Furthermore, although a case has been described with the present embodiment where basic loader 32 receives an issued terminal application and soon starts this terminal application, the present invention is by no means limited to this, and it is equally possible to have terminal application 31 signed by issue application 12 and start terminal application 31 upon verification of this signature by basic loader 32, so as to prevent starting invalid terminal application 31.

Embodiment 2

Embodiment 2 of the present invention will be described with respect to a secure device that holds a terminal application called an MTA (Master Trusted Agent) that has functions to substitute part of the processings of the secure device on an information processing terminal and other terminal applications. When this secure device is installed in an information processing terminal, first, a terminal application called MTA will be issued from the secure device to the information processing terminal and started by the information processing terminal, and, when the MTA is authenticated by means of authentication information embedded in the MTA, later terminal applications will be started through an intermediary of this MTA. That is, when the information processing terminal requests start of the terminal application after the secure device is installed, the terminal application with application authentication information embedded therein will be issued by the secure device via the MTA. When the MTA starts the terminal application, an authentication will be performed by means of the application authentication information.

By this means, in addition to, and in consideration of Embodiment 1, according to Embodiment 2, when the secure device is installed in the information processing terminal, first, a terminal application called an MTA will be issued from the secure device to the information processing terminal, and started and authenticated, and this first-authenticated application MTA will start other terminal applications to be executed, so that the likelihood of having these other terminal applications to be executed analyzed will become low.

Figure 9:
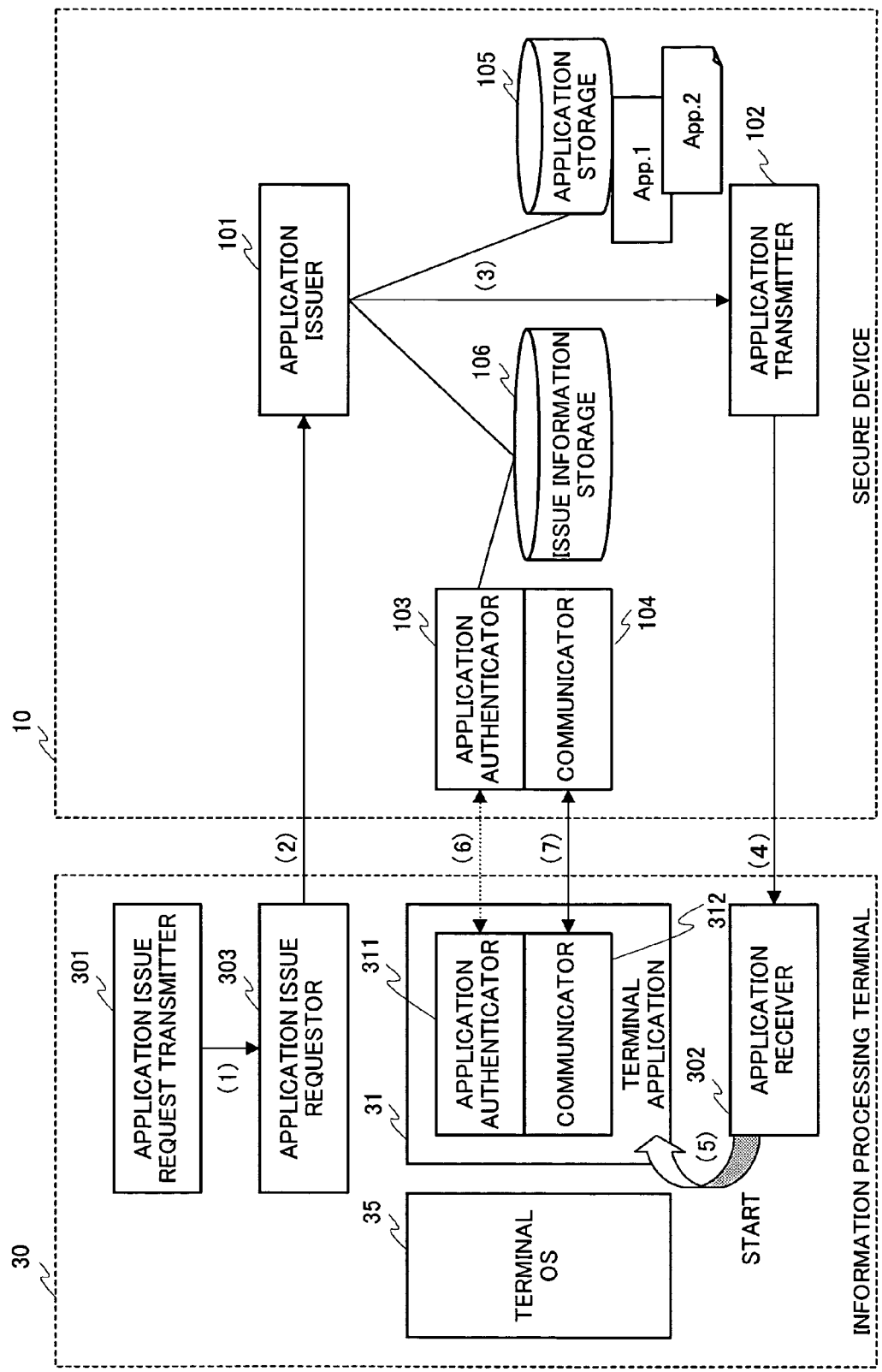
FIG. 9 is a functional block diagram of an information processing terminal and a secure device according to Embodiment 2 of the present invention.

Referring to FIG. 9, information processing terminal 30 according to embodiment 2 has terminal OS 35, application issue request transmitter 301 that requests issue of a terminal application, application receiver 302 that receives an issued terminal application, and application issue requestor 303 that requests issue of a terminal application. As in Embodiment 1, terminal application 31 to be started has application authenticator 311 that performs an authentication based on embedded application authentication information, and communicator 312 that communicates with card application 11 on secure device 10.

Meanwhile, as in Embodiment 1, secure device 10 has application issuer 101 that embeds application authentication information in terminal application 31 and issues terminal application 31, application transmitter 102 that transmits issued terminal application 31, application authenticator 103 that authenticates issued terminal application 31 based on the embedded application authentication information, communicator 104 that communicates with terminal application 31 on information processing terminal 30, application storage 105 that holds authenticity-confirmed terminal application 31, and issue information storage 106 that stores the application authentication information embedded in terminal application 31 upon issue.

Next, the operations in FIG. 9 will be described. Upon request for start of terminal application 31 from the user, application issue request transmitter 301 of information processing terminal 30 transmits an issue request for terminal application 31 to application issue requestor 303 ((1) in FIG. 9). Application issue requester 303 requests application issuer 101 to start the requested terminal application ((2) in FIG. 9). Application issuer 101 reads terminal application 31 from application storage 105, performs issue processing including embedding application authentication information, which is generated on a random basis upon every issue of terminal application 31, associates issue-related information including an application ID (i.e. application identifier) of terminal application 31 and the embedded application authentication information and saves these in issue information storage 106, and passes issued terminal application 31 to application transmitter 102 ((3) in FIG. 9). Application transmitter 102 transmits issued terminal application 31 to application receiver 302 of information processing terminal 30 ((4) in FIG. 9). Application receiver 302 receives and starts issued terminal application 31 ((5) in FIG. 9). Application authenticator 311 of terminal application 31 performs an authentication with application authenticator 103 of secure device 10 by means of an application authentication key, using the embedded application authentication information. ((6) in FIG. 9). If, as a result of this authentication, terminal application 31 operating on information processing terminal 30 is authenticated, communicator 312 of terminal application 31 and communicator 104 of secure device 10 will communicate information including confidential information 132 stored in secure device 10 by sharing a key apart from the application authentication key—that is, a new key generated during the authentication process by the application authentication information ((7) in FIG. 9).

Figure 10B:
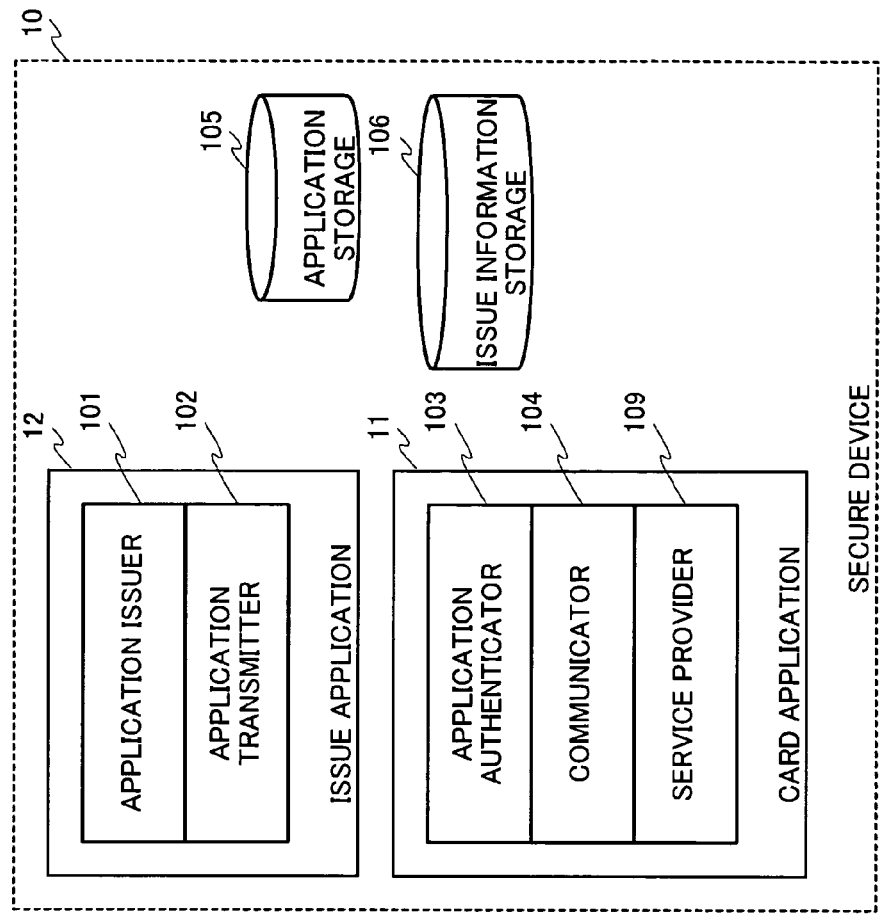
FIG. 10B is a configuration diagram of the information processing terminal of FIG. 9.
Figure 10A:
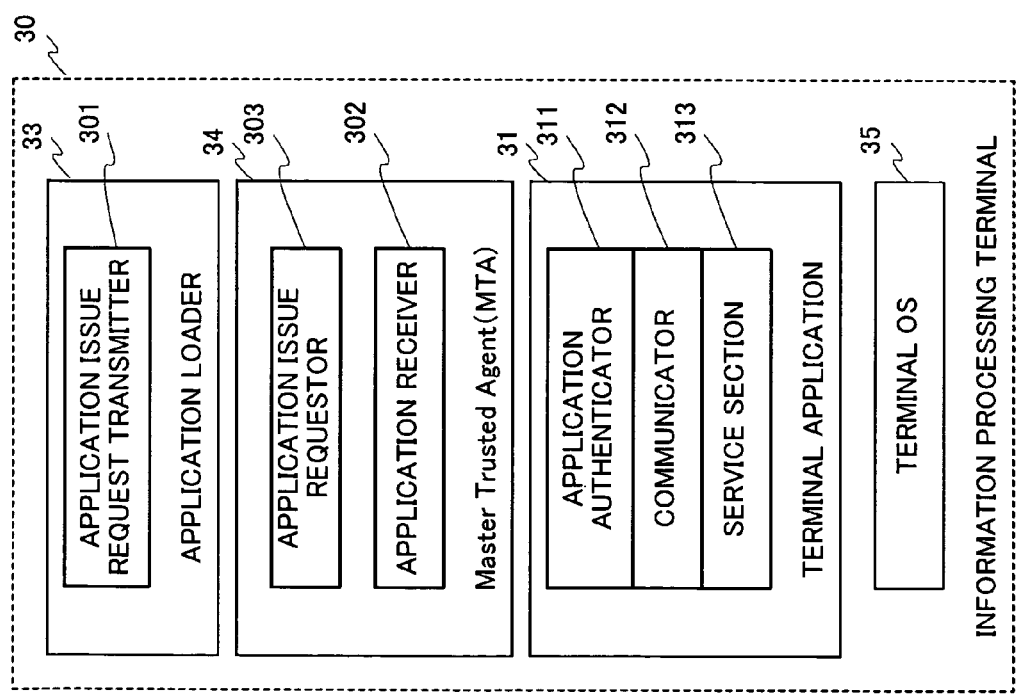
FIG. 10A is a configuration diagram of the secure device of FIG. 9.

FIG. 10A and FIG. 10B are configuration diagrams, showing configurations for implementing the function blocks of information processing terminal 30 and secure device 10 according to Embodiment 2, respectively.

On information processing terminal 30, application authenticator 311, communicator 312, and service section 313 that receives services, presents information to the user, and accepts input are implemented by terminal application 31. Application issue request transmitter 301 is implemented by application loader 33 that requests issue of a terminal application. Application receiver 302 and application issue requestor 303 are implemented by MTA 34.

On secure device 10, application issuer 101 and application transmitter 102 are implemented by issue application 12. Application authenticator 103, communicator 104, and service provider 109 that provides services, are implemented by card application 11. Application storage 105 and issue information storage 106 are memory fields on secure device 10 that are tamper-resistant and are therefore difficult to access directly from the outside, and are implemented by, for example, a EEPROM and a flash memory in secure device 10.

Figure 11:
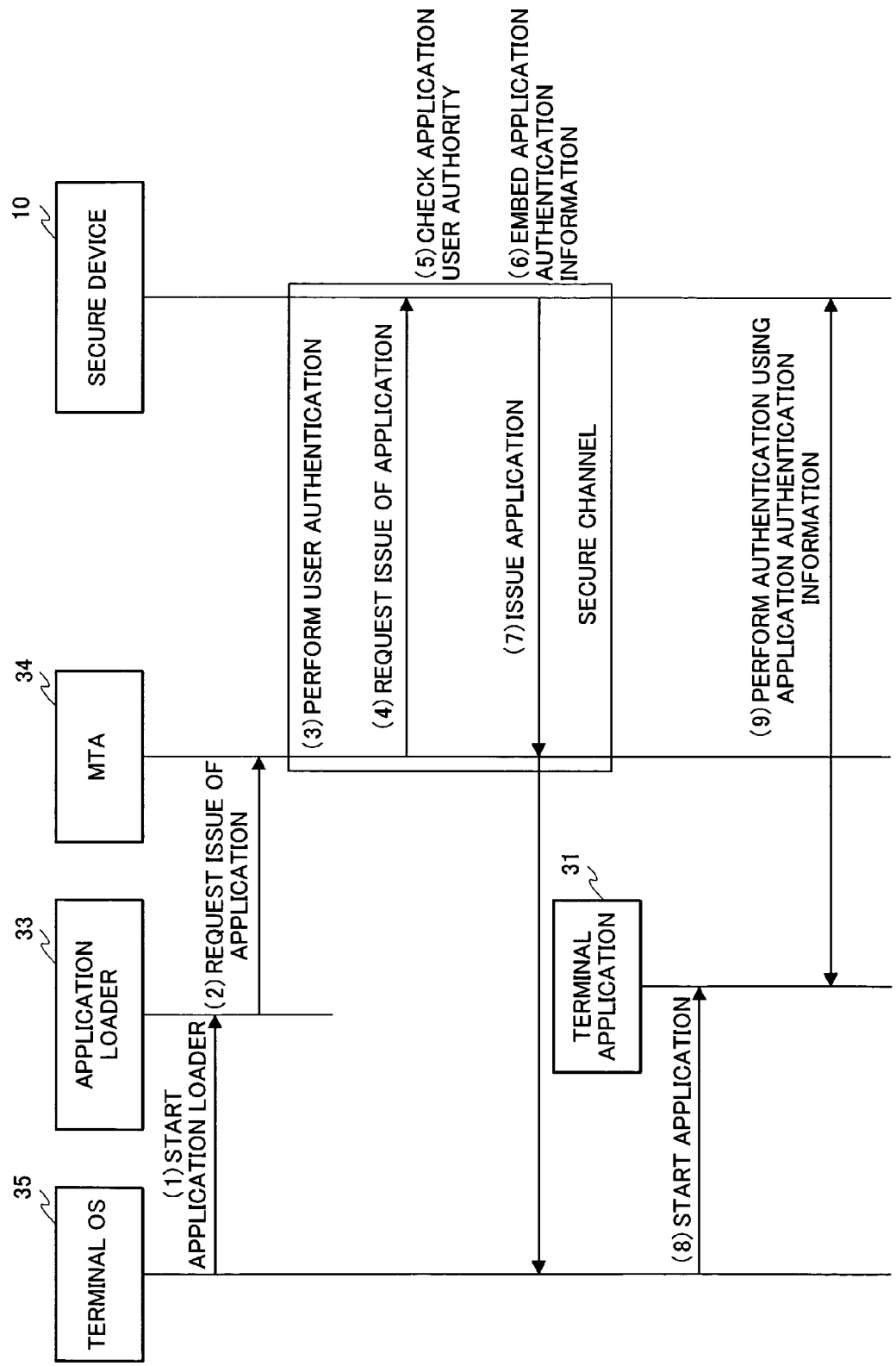
FIG. 11 is a sequence diagram of Embodiment 2 of the present invention.

The sequence diagram of FIG. 11 shows the steps of processing by secure device 10 and information processing terminal 30 according to Embodiment 2.

Terminal OS 35 starts application loader 33 upon request from the user of information processing terminal 30 and upon detection of insertion of secure device 10 in information processing terminal 30 ((1) in FIG. 11). Thereupon issue of MTA 34 is requested automatically from information processing terminal 30 to secure device 10, information processing terminal 30 receives and starts MTA 34 with application authentication information embedded therein, and, like other terminal applications 31, authentication processing is performed with secure device 10, and MTA 34 in operation is authenticated. Application loader 33 reports the application ID that specifies terminal application 31 to be started to MTA 34 ((2) in FIG. 11) When necessary, MTA 34 works with secure device 10 and performs a user authentication ((3) in FIG. 11). An application issue request is transmitted to issue application 12 of secure device 10 ((4) in FIG. 11).

Issue application 12 checks whether the user has authority to start the terminal application ((5) in FIG. 11), and, upon approval, embeds application authentication information in terminal application 31 that was specified and is to be issued ((6) in FIG. 11), and transmits this terminal application 31 to MTA 34 ((7) in FIG. 11).

MTA 34 starts received terminal application 31 ((8) in FIG. 11). Terminal application 31 performs an authentication with card application 11 using the embedded application authentication information ((9) in FIG. 11), and implements the program by communicating information including confidential information 132 using a newly generated key.

Here MTA 34 has been authenticated, and, the above processings from the user authentication by MTA 34 ((3) in FIG. 11) to the issue of terminal application 31 by secure device 10 ((7) in FIG. 11) are executed on an authenticated secure channel. In addition, terminal application 31 that is issued from secure device 10 and is to be executed is received by application receiver 302 of MTA 34. Consequently, compared to the case of Embodiment 1 where MTA 34 is not used, it is possible to prevent, for example, request for issue of limited terminal application 31, and to definitely prevent tampering of terminal application 31 received from secure device 10.

Thus, according to Embodiment 2, in information processing terminal 30, secure device 10 is installed that holds an application herein referred to as MTA 34 and other terminal applications 31, and, on this information processing terminal 30, MTA 34 is first issued, started and authenticated, and this authenticated application of MTA 34 starts other terminal applications 31 that are to be executed after start of MTA 34, so that there is little likelihood that terminal applications 31 to be executed are analyzed.

Especially, according to Embodiment 2, authenticated MTA 34 performs processings from user authentication to issuing terminal application 31 by means of secure device 10, and terminal application 31 that is issued from secure device 10 and that is to be executed is received in application receiver 302 of MTA 34, so that, in comparison to Embodiment 1 which does not employ MTA 34, it is possible to more definitely prevent tampering of terminal application 31 in information processing terminal 30.

Incidentally, with this embodiment such a configuration is also possible where the MTA has an application executing means that is equivalent with a VM (Virtual Machine) of JAVA, and the MTA itself executes applications other than the MTA. With this configuration, the secure device would be able to rely upon the application executing means that executes other applications than the MTA, so that applications other than the MTA can be executed securely such as by erasing confidential information after execution.

Moreover, although a case has been described with this embodiment where, when MTA 34 requests secure device 10 to issue terminal application 31, secure device 10 will embed authentication information and issue this terminal application 31 to MTA 34, it is equally possible to pass terminal application 31 and instruction 133 to MTA 34 without having secure device 10 perform the embedment, and MTA 34 will embed the authentication information embedded in MTA 34 itself into terminal application 31 and start terminal application 31. By this means, there is no load of issue upon secure device 10.

Moreover, upon issuing MTA 34, secure device 10 is able to embed extra authentication information, in addition to the authentication information for authentication of MTA 34, that MTA 34 can later embed in terminal application 31. MTA 34 may request authentication information to be embedded from secure device 10 and has that information transmitted. By this means, it is possible to reduce the load on secure device 10 without risking security.

In addition, although a case has been described with this embodiment where, when MTA 34 requests secure device 10 to issue terminal application 31, secure device 10 will embed authentication information in terminal application 31 and issue this terminal application 31 to MTA 34, it is equally possible that secure device 10 will not perform the embedment but simply pass terminal application 31 and new authentication information to MTA 34 and MTA 34 will pass the authentication information to terminal application 31 and start terminal application 31, thereby starting the terminal application in a way that does not require embedment processing. By this means, it is possible to spare the trouble of making terminal application 31 into format that enables embedment.

Embodiment 3

Embodiment 3 of the present invention will be described with respect to a secure device that holds a terminal application called an MTA (Master Trusted Agent), and an information processing terminal that holds an encrypted terminal application (hereinafter "encrypted application").

Embodiments 1 and 2 required plenty of storage capacity in the secure device to store terminal applications in the secure device. However, if there is only insufficient capacity, such as is the case with an IC card, it will be necessary to store terminal applications in the information processing terminal, and, furthermore, encryption will be required to prevent analysis and unauthorized use.

In view of the above-described problem, this embodiment will disclose a method of starting that enables the secure device and terminal application to perform authentication.

Moreover, when the secure device is installed in the information processing terminal, a terminal application called an MTA will start and be authenticated, and later terminal applications will be started by this MTA. Therefore, with this embodiment, when the information processing terminal requests start of a terminal application, the MTA will receive an application encryption key and a hash value from the secure device, decode and verify the encrypted application. When this decoded encrypted application is verified by the hash value not to have been tampered with, the MTA will pass application authentication information to the terminal application and secure device and start the terminal application, and thereupon an authentication by the application authentication information will be performed.

Figure 12:
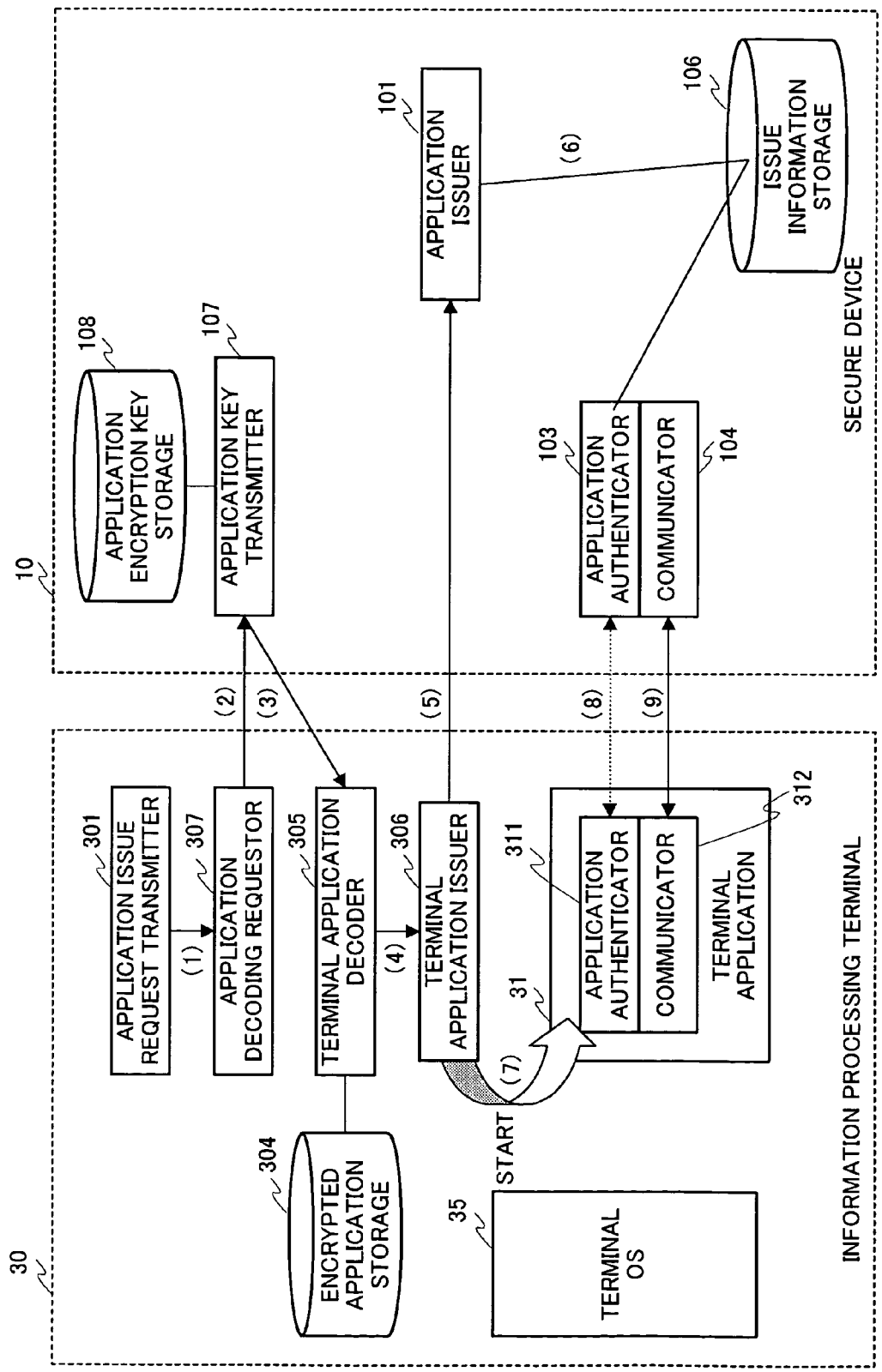
FIG. 12 shows a functional block diagram of an information processing terminal and a secure device according to Embodiment 3 of the present invention.

Referring to FIG. 12, information processing terminal 30 of Embodiment 3 has terminal OS 35, application issue request transmitter 301 that requests issue of a terminal application, application decoding requestor 307 that requests decoding of the terminal application, encrypted application storage 304 that stores an encrypted applications, terminal application decoder 305 that receives from secure device 10 a key for decoding the encrypted application and decodes the encrypted application, terminal application issuer 306 that receives decoded terminal applications 31 and issues this terminal application 31. Similar to Embodiment 1, terminal application 31 to be started has application authenticator 311 that performs an authentication based on application authentication information, and communicator 312 that communicates with card application 11 on secure device 10.

Now, secure device 10 of Embodiment 3 has application issuer 101 that receives the application ID and application authentication information of terminal application 31 from information processing terminal 30, application authenticator 103 that performs an authentication based on the application authentication information, communicator 104 that communicates with terminal application 31 on information processing terminal 30, issue information storage 106 that associates the application authentication information received from information processing terminal 30 with the application ID of terminal application 31 and store them, application encryption key transmitter 107 that transmits an application authentication key for use in decoding of specified terminal application 31 to information processing terminal 30, and application encryption key storage 108 that stores the application ID of terminal application 31, the application encryption key for decoding terminal application 31, and the accurate hash value of terminal application 31.

Next, the operations in FIG. 12 will be described. Upon request for start of terminal application 31 from the user, application issue request transmitter 301 of information processing terminal 30 transmits a request for issue of terminal application 31 to application issue requester 303 ((1) in FIG. 12). Application issue requestor 303 transmits the application ID, which is the identification information of encrypted terminal application 31 that is to be executed, and requests an application encryption key for decoding requested terminal application 31 and a hash value for use in verification. Based on the application ID received, application encryption key transmitter 107 reads the corresponding application encryption key and hash value from application encryption key storage 108, and transmits these to terminal application decoder 305 ((3) in FIG. 12). Terminal application decoder 305 reads encrypted terminal application 31 from encrypted application storage 304, decodes it using the application encryption key received from secure device 10 and calculates the hash value, and examines whether terminal application 31 has not been tampered with ((4) in FIG. 12). Then, when terminal application 31 is verified not to have been tampered with, terminal application issuer 306 will perform issue processing including generating application authentication information on a random basis with different values upon every issue of terminal application 31, and transmit issued-related information to application issuer 101 of secure device 10 including the application ID (i.e. application identifier) of terminal application 31, and application authentication information ((5) in FIG. 12). Upon receiving the application ID of terminal application 31 and the application authentication information, application issuer 101 associates these and store them in issue information storage 106 ((6) in FIG. 12). Meanwhile, terminal application issuer 306 passes the application authentication information to decoded terminal application 31 through embedment, and starts terminal application 31 ((7) in FIG. 12). By this means, as in Embodiment 1, application authenticator 311 of terminal application 31 generates the application authentication key based on the application authentication information and performs an authentication with application authenticator 103 of secure device 10 ((8) in FIG. 12). Then, communicator 312 of information processing terminal 30 and communicator 104 of secure device 10 communicate information including confidential information 132 stored in secure device 10 (see FIG. 4) using a new key apart from the application authentication key, that is shared anew during the authentication processing by the application authentication information ((9) in FIG. 12).

Figure 13B:
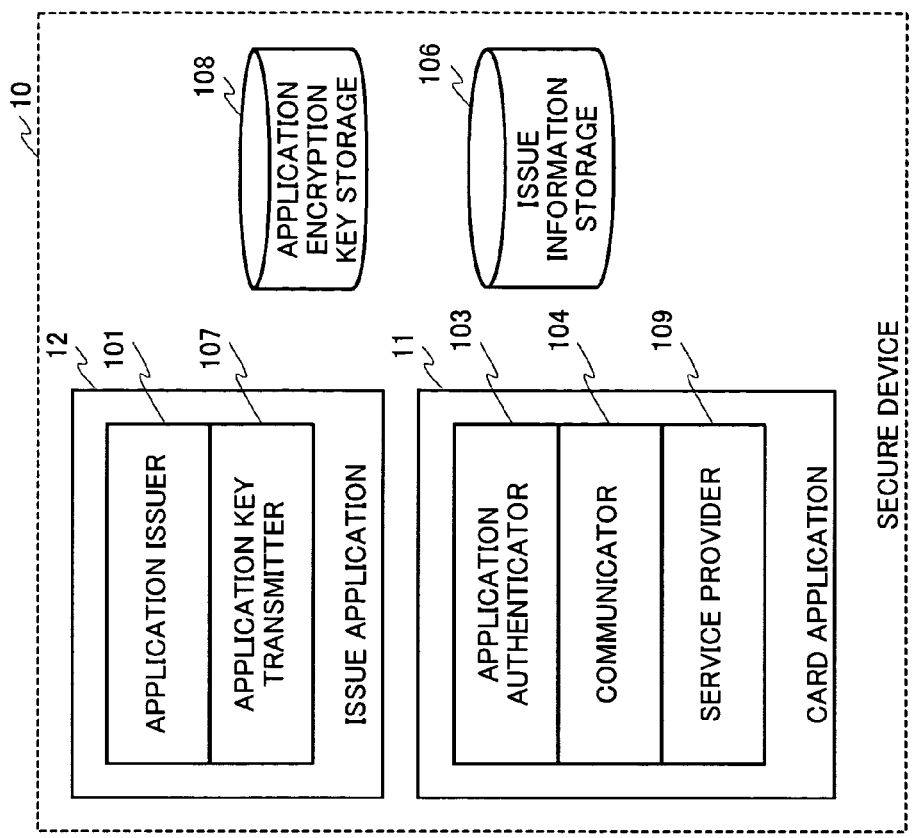
FIG. 13B is a configuration diagram of the information processing terminal of FIG. 12.
Figure 13A:
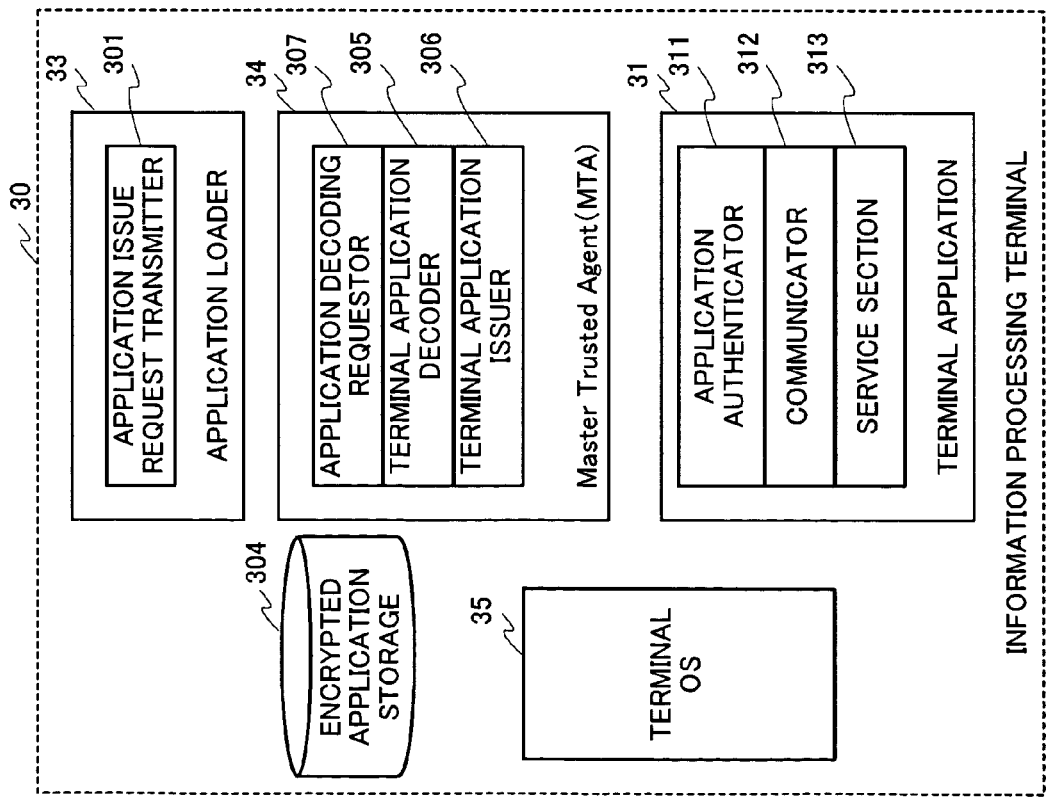
FIG. 13A is a configuration diagram of the secure device of FIG. 12.

FIG. 13A and FIG. 13B are configuration diagrams, showing configurations for implementing the function blocks of information processing terminal 30 and secure device 10 according to Embodiment 3, respectively.

In information processing terminal 30, application authenticator 311, communicator 312, and service section 313 that receives services and that displays information to the user and accepts input are implemented by means of terminal application 31. Application issue request transmitter 301 is implemented by application loader 33. Application decoding requester 307, terminal application decoder 305, and terminal application issuer 306 are implemented by MTA 34.

In secure device 10, application issuer 101 and application encryption key transmitter 107 are implemented by issue application 12. Application authenticator 103, communicator 104, and service provider 109 that provides services, are implemented by means of card application 11. Issue information storage 106 and application encryption key storage 108 are memory fields on secure device 10 that are tamper-resistant and are therefore difficult to access directly from the outside, and are implemented by, for example, a EEPROM and a flash memory in secure device 10.

Figure 14:
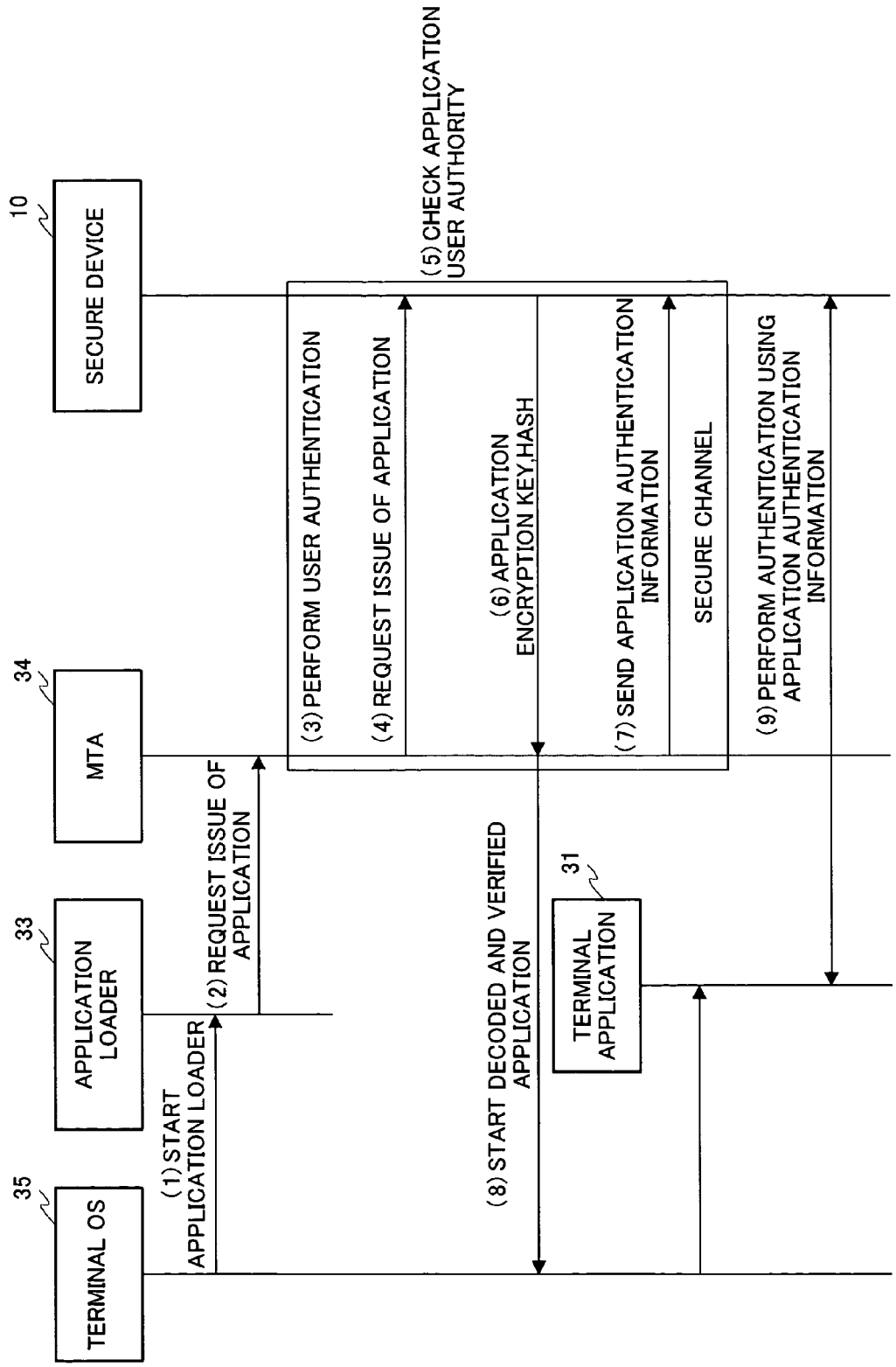
FIG. 14 is a sequence diagram according to Embodiment 3 of the present invention.

The sequence diagram of FIG. 14 shows the steps of processing by secure device 10 and information processing terminal 30 of Embodiment 3.

Terminal OS 35 starts application loader 33 upon request from the user of information processing terminal 30 and upon detection of insertion of secure device 10 in information processing terminal 30 ((1) in FIG. 14). Thereupon, similar to the case of Embodiment 2, issue of MTA 34 is requested automatically from information processing terminal 30 to secure device 10, information processing terminal 30 receives and starts MTA 34 with application authentication information embedded therein, and, like other terminal applications 31, authentication processing is performed with secure device 10 and authentication is completed. Application loader 33 reports the application ID that specifies the encrypted application to be issued to MTA 34 ((2) in FIG. 14). When necessary, MTA 34 works with secure device 10 and performs a user authentication ((3) in FIG. 11), and transmits a request for an application encryption key for use in decoding encrypted terminal application 31 corresponding to the application ID, to issue application 12 of secure device 10 ((4) in FIG. 14).

Issue application 12 checks whether the user has authority to start the terminal application 31 ((5) in FIG. 14), and, upon approval, transmits the application encryption key and hash value corresponding to the application ID, to MTA 34 ((6) in FIG. 14). MTA 34 decodes encrypted terminal application 31 using the application encryption key received, calculates the hash value, and verifies that terminal application 31 has not been tampered with, and thereafter transmits application authentication information, which is generated differently upon every decoding, to issue application 12 with the application ID ((7) in FIG. 14). Issue application 12 then associates the application ID with the application authentication information and stores them. When tampering is detected, terminal application 31 will not be started.

Moreover, MTA 34 passes application authentication information to terminal application 31 and starts terminal application 31 on the terminal OS ((8) in FIG. 14). Terminal application 31 uses this passed application authentication information and performs an authentication with card application 11 ((9) in FIG. 14), and communicates information including confidential information and executes the program.

Similar to Embodiment 2, MTA 34 has been authenticated, and, the above processings from the user authentication by MTA 34 ((3) in FIG. 14) to the issue of terminal application 31 by secure device 10 ((7) in FIG. 14) are executed on an authenticated secure channel, so that, compared to the case of Embodiment 1 where MTA 34 is not used, it is possible to, for example, definitely prevent request for issue of limited terminal application 31 to secure device 10.

Figure 15:
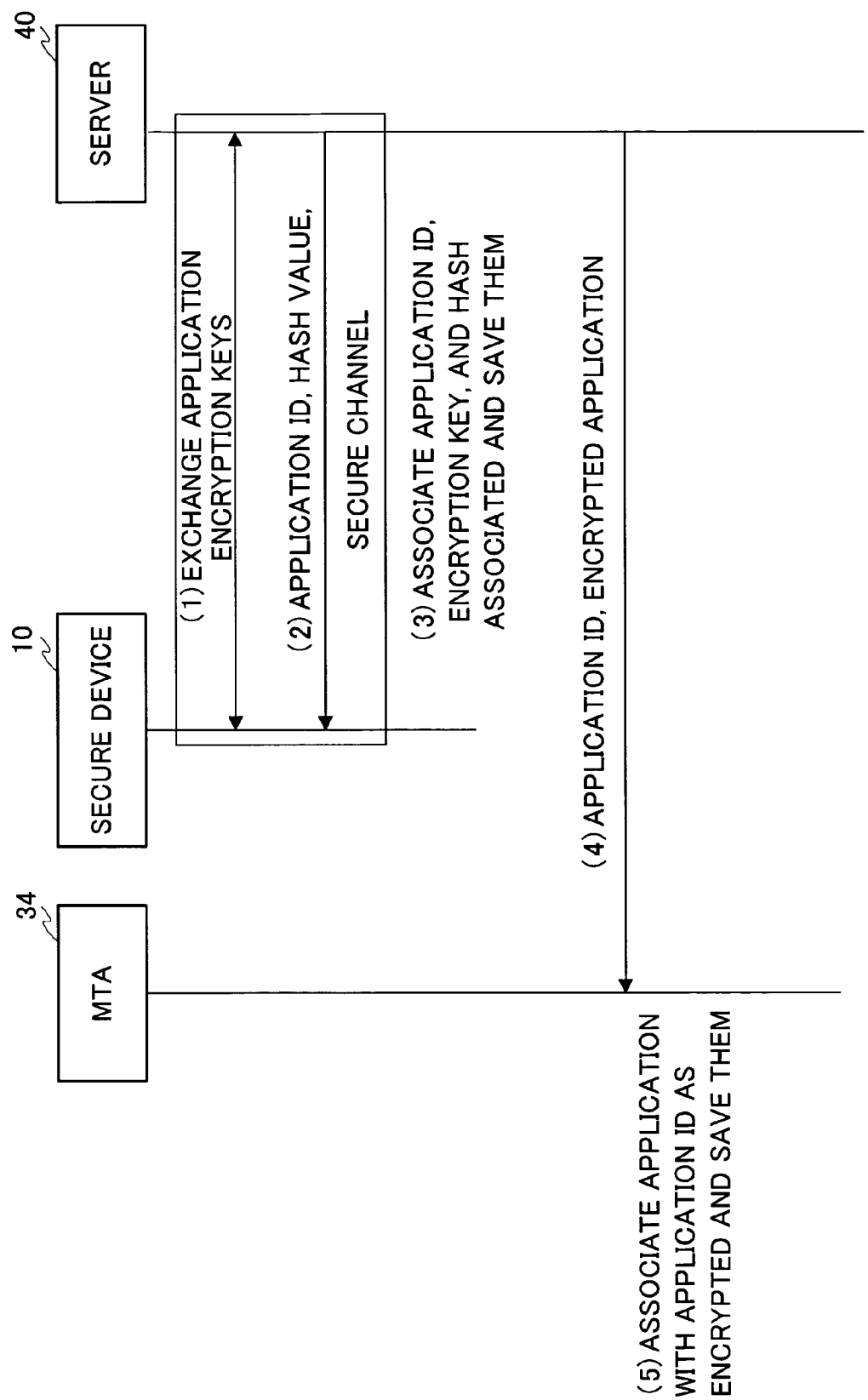
FIG. 15 is a sequence diagram explaining installation of encrypted application according to Embodiment 3 of the present invention.

The sequence diagram of FIG. 15 shows the steps of processing of installing an encrypted application in information processing terminal 30.

When terminal application 31 that is desired to be loaded is somehow indicated to server 40 such as terminal application generation apparatus 20 (see FIG. 4)—for example the user may make an indication via the WWW (World Wide Web)—server 40 will share the application authentication key for decoding terminal application 31 with secure device 10 ((1) in FIG. 15). After that, the application ID of this terminal application and the hash value for verification are reported to secure device 10 ((2) in FIG. 15). Secure device 10 associates the application ID, application encryption key, and hash value, and store them ((3) in FIG. 15). Server 40 encrypts terminal application 31 using the application encryption key shared with secure device 10 and makes an encrypted application, and transmits this with the application ID to MTA 34 of information processing terminal 30 ((4) in FIG. 15). MTA 34 associates encrypted terminal application 31 without modification with the application ID, and stores them in encrypted application storage 304 ((5) in FIG. 15).

Following the above steps, the application encryption key and hash value are stored in secure device 10 and encrypted terminal application 31 is stored in information processing terminal 30. The example of FIG. 15 illustrates a case where MTA 34 is issued from secure device 10 to information processing terminal 30, and started and authenticated, before the encrypted application is installed in information processing terminal 30. However, if MTA 34 is not issued to information processing terminal 30, although reliability might fall off, it is also possible to provide application loader 33 in information processing terminal 30 with the above functions.

FIG. 16 is a specific example of data stored in application encryption key storage 108. Application encryption key storage 108 has the application ID, application encryption key, and hash value of encrypted terminal application 31 written therein. For example, the second line indicates that terminal application 31 having the application ID of ap1 has an application authentication key of "0xeface321" and a hash value of "0x7ae9a3ca."

Thus, according to Embodiment 3, secure device 10 that holds an application called an MTA is installed in information processing terminal 10 that holds encrypted terminal application 31, first, this MTA 34 will start, and encrypted application 34 will be started after start of MTA 34, by authenticated MTA 34, so that, similar to Embodiment 2, there is little likelihood that terminal application 31 is analyzed, and, in comparison to the case of Embodiment 1 where MTA 34 is not used, it is possible to definitely present tampering of terminal application 31 in information processing terminal 30.

In particular, according to Embodiment 3, upon request for start of encrypted terminal application 31 stored in information processing terminal 30, MTA 34 will receive the application encryption key and hash value from secure device 10, decode and verify encrypted terminal application 31, and thereafter pass application authentication information to decoded terminal application 31 and secure device 10, and, when decoded terminal application 31 is started, an authentication by means of the application authentication information will be performed. By this means, even when secure device 10 is unable to store a large capacity application or many applications and encrypted terminal application 31 has to be stored in information processing terminal 30, secure device 10 is still capable of performing an authentication.

Incidentally, with this embodiment such a configuration is also possible where the MTA has an application executing means that is equivalent with a VM (Virtual Machine) of JAVA, and the MTA itself executes applications other than the MTA. With this configuration, the secure device would be able to rely upon the application executing means that executes other applications than the MTA, so that applications other than the MTA can be executed securely such as by erasing confidential information after execution.

When secure device 10 has room in memory capacity and when communication with information processing terminal 30 is performed at a desirable rate, it is equally possible not to decode encrypted terminal application 31 in information processing terminal 30, but instead pass this encrypted terminal application 31 to secure device 10 and decode it in secure device 10. By this means, this encrypted terminal application 31 can be decoded in secure device 10 without taking the application encryption key outside secure device 10, thereby, as in the case of Embodiment 2, making it possible to issue decoded terminal application 31 to information processing terminal 30.

Although a case has been described with this embodiment where MTA 34 simply passes application authentication information to decoded terminal application 31, it is equally possible to perform embedment processing with decoded terminal application 31 as is the case with issue application 12. In this case, instruction 133, which instructs only up to the embedment processing but in which no method of calculating the application authentication key is written, is encrypted with terminal application 31 and stored in information processing terminal 30, or, such instruction 133 is stored with MTA 34 in secure device 10 and transmitted to information processing terminal 30 upon issue of MTA 34 and upon receipt of the application authentication key Moreover, although a case has been described with this embodiment where MTA 34 generates application authentication information and passes it to secure device 10, it is equally possible that MTA 34 simply requests secure device 10 to generate application authentication information and receives the application authentication information generated by secure device 10.

Moreover, although a case has been described with the present embodiment where MTA 34, which is an application issued from secure device 10 to information processing terminal 30 and started and authenticated, requests an application authentication key for decoding encrypted terminal application 31, the present invention is by no means limited to this, and it is equally possible to give the above functions of MTA 34 to applications, firmware and terminal OS 35 provided in advance in information processing terminal 30. By this means, the process of issuing MTA 34 from secure device 10 to information processing terminal 30 can be spared, so that, it is possible to shorten the time for starting encrypted terminal application 31. However, if this be the case, it will be necessary to indicate that information processing terminal 30 has standard and valid firmware and OS mounted thereon by means of device authentication or equivalent.

Embodiment 4

Embodiment 4 of the present invention will be described in respect to a case where a secure device embeds into terminal application 31, as authentication information, not the value itself, but a dynamic method, that is, an authentication information method that is generated differently every time in the form of a method (i.e., function) for calculating the value, so as to make it difficult for a third party to analyze the terminal application and thus further improve security.

Application authentication information should employ an embedment method of maximum possible security. At the same time, such a method should be executable by means of card applications of limited resources. Methods are required that fulfill the above two factors.

Ideally, application authentication information should be made unextractable by any means besides the authentication program of a terminal application. However, if the terminal application is taken and analyzed, application authentication information may eventually be extracted. So, security measures should be contemplated on the assumption that analysis does occur, and this way security improves much greater.

Even if a terminal application is analyzed and extracted, upon the next time of use analysis is again necessary, so that automatic extraction can be made difficult.

Embodiment 4 therefore adopts the technique of the dynamic method described below. The basic operations of Embodiment 4 are substantially the same as those of Embodiment 1, except that the terminal application is issued by a new method. The following descriptions will describe the operations of an application issuer of a secure device, which is where the terminal application is issued.

To explain the dynamic method of this embodiment briefly, according to this embodiment, when a secure device is installed in an information processing terminal and the information processing terminal requests start of a terminal application, a calculation formula is generated on a random basis by the secure device, and a program code will be generated automatically that performs this calculation.

When this program code is embedded in the terminal application as an authentication information method that calculates application authentication information, this program-code-embedded terminal application is issued to the information processing terminal, and the information processing terminal starts the terminal application, the program code of the authentication information method embedded in the terminal application will calculate application authentication information and an authentication will be performed based on the application authentication information between the secure device and the information processing terminal.

Figure 17:
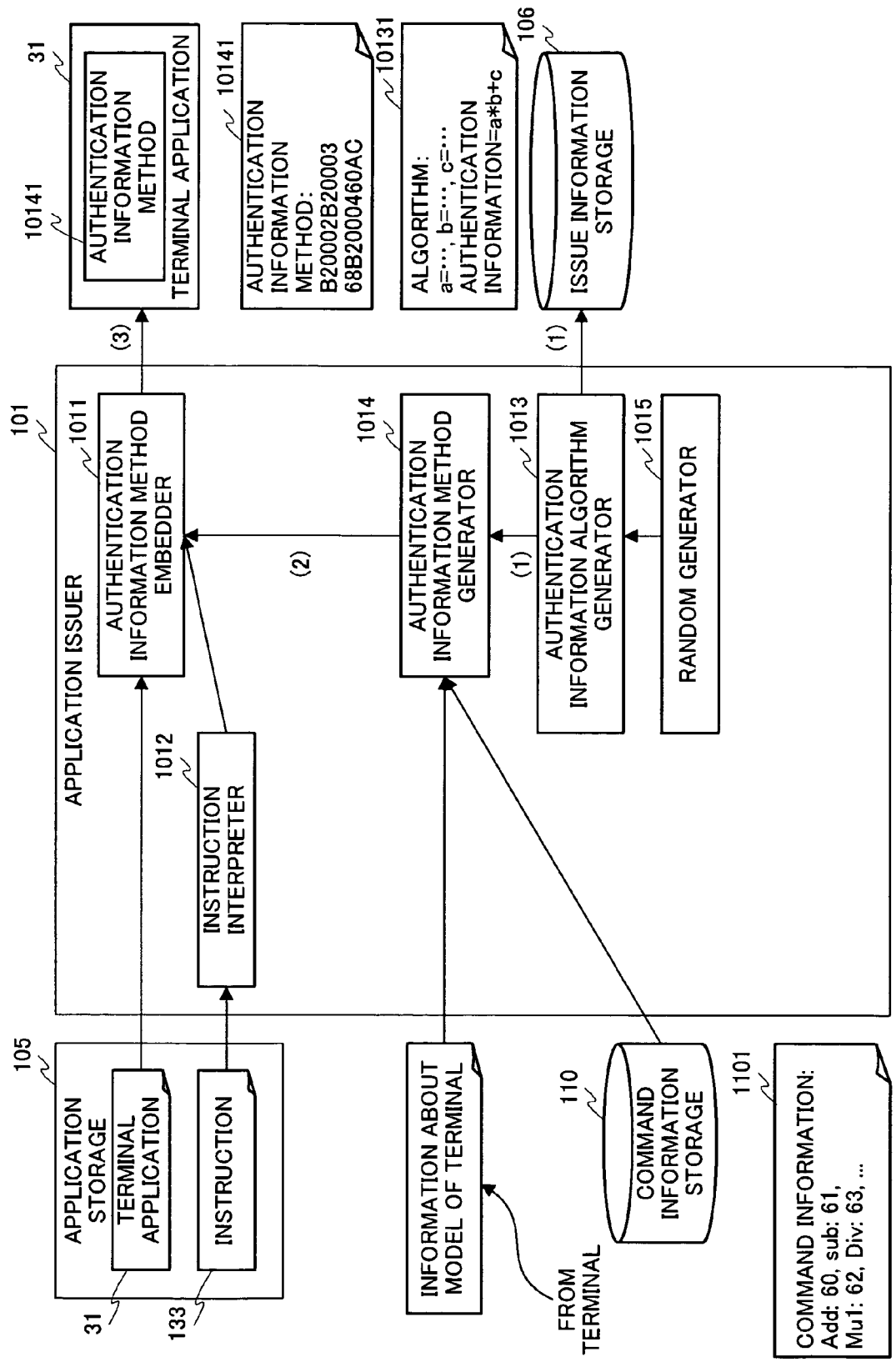
FIG. 17 shows a functional block diagram showing an information processing terminal and secure device according to Embodiment 4 of the present invention.

FIG. 17 shows the configuration and process flow of secure device 10 of Embodiment 4 of the present invention.

Referring to FIG. 17, application issuer 101 of secure device 10 of Embodiment 4 has authentication information method embedder 1011 that embeds application authentication information, instruction interpreter 1012 that interprets instruction 133 stored in application storage 105 and tells the method for embedding the application authentication information to authentication information method embedder 1011, authentication information algorithm generator 1013 that, on a random basis, generates the algorithms for calculating the application authentication information, authentication information method generator 1014 that generates an authentication information method, which refers to a program code for information processing terminal 30 that actually performs the calculation of the application authentication information according to the algorithm for calculation of the application authentication information, and random generator 1015 that generates randoms for generating the algorithms on a random basis. In comparison to the configuration of Embodiment 1, secure device 10 of Embodiment 4 has command information storage 110 in addition, which stores command information that authentication information method generator 1014 uses to generate application information methods.

The operations in FIG. 17 will be described next. Authentication information algorithm generator 1013 uses the randoms from random generator 1015 and, on a random basis, generates formulas that represent the algorithm for calculating application authentication information, and passes these to authentication information method generator 1014. The results of calculation of these formulas representing the algorithm are stored in issue information storage 106 ((1) in FIG. 17). Algorithm 10131 illustrates an example of such an algorithm. Variables A, B, and C are substituted with values through the same processing as in Embodiment 1, and authentication information is calculated by a*b+c.

Based on model information with respect to information processing terminal 30, which information processing terminal 30 transmits upon request of issue, authentication information method generator 1014 obtains, command information 1101 corresponding to the type of the processor apparatus (CPU) of information processing terminal 30 from command information storage 110. Based on this command information 1101, authentication information method generator 1014 converts algorithm 10131 from authentication information algorithm generator 1013, into a kind of command sequence which the CPU can understand, and thus generates authentication information method 10141, and passes the result to authentication information method embedder 1011 ((2) in FIG. 17). Command information 1101 stored in command information storage 110 shows an example of command information which the processing apparatus (CPU) of this information processing terminal 30 executes, and is shown as information for converting algorithm for calculating application authentication information into a program code that can be executed by information processing terminal 30. Authentication information method 10141 shows an example of an authentication information method, and is a program code that can be executed by the processing apparatus (CPU) of information processing terminal 30.

Application information method embedder 1011 receives authentication information method 10141 that is generated, and, following the content of instruction 133, embeds authentication information method 10141 in terminal application 31. At this time, in addition to the command sequence, values that substitute the variables in the formula are embedded in the variable field ((3) in FIG. 17).

Consequently, when terminal application 31 is started on information processing terminal 30, authentication information method 10141 will be executed and application authentication information will be calculated. Values that are necessary to perform an authentication based on this application authentication information are saved in issue information storage 106, and application authenticator 103 of secure device 10 performs authentication processing based on this application authentication information.

Next, the processing by this embodiment will be described in detail with reference to FIG. 4. In the following, only parts that implement different operations from Embodiment 1 will be explained, and the rest of the operations is the same as in Embodiment 1.

First, preparations for putting terminal application 31 and instruction 133 in secure device 10, corresponding to the operations of (1) to (4) in FIG. 4, will be explained.

Figure 18C:
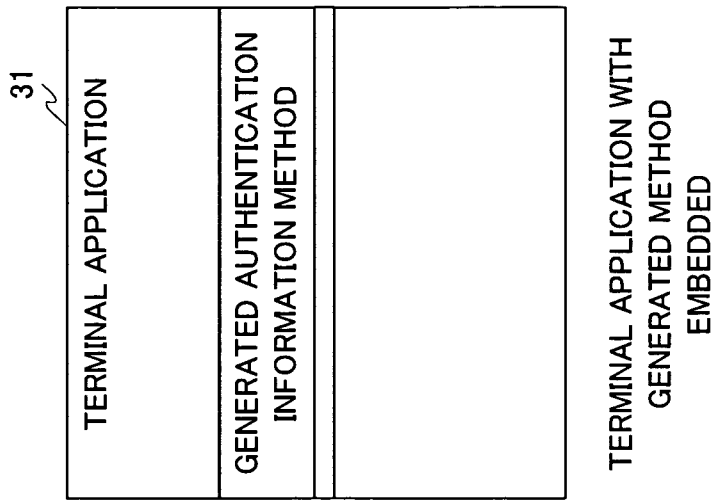
FIG. 18C shows a terminal application with a generated method embedded therein.
Figure 18B:
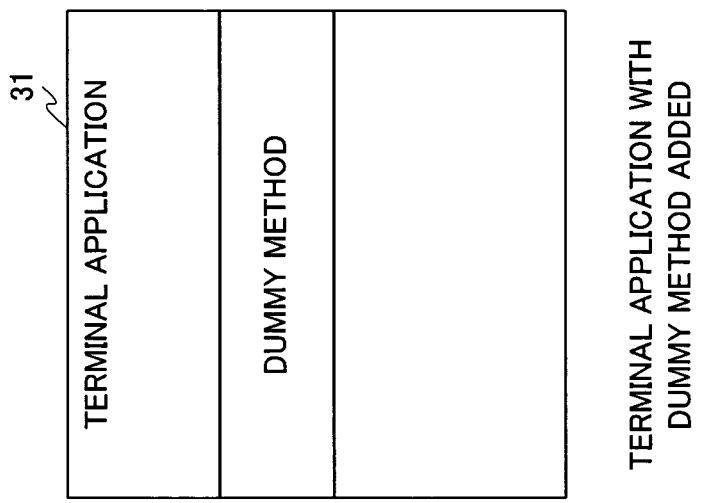
FIG. 18B shows an terminal application with an addition of a dummy method.
Figure 18A:
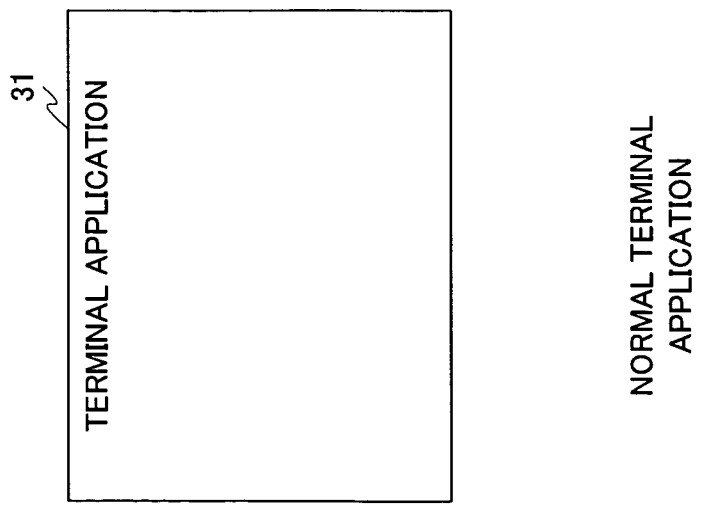
FIG. 18A shows a normal terminal application.

First, the developer of terminal applications creates terminal application 31. Terminal application 31 created then is normal terminal application 31. FIG. 18A illustrates a physical image of this normal terminal application.

Next, a dummy method for embedment of authentication information method 10141 is prepared in advance in the terminal application. FIG. 18B illustrates a physical image of terminal application 31 with an addition of a dummy method.

This dummy method refers to a method that returns variable type values (e.g., "int," which is integer type) that are convenient to express application authentication information. The dummy method performs the function of a place holder that secures the place to embed authentication information method 10141 within binary expression. The dummy method may be a method that simply returns 0, or, if it is difficult to make the length of the method greater upon issue, it is certainly possible to make a more complex method and secure the adequate length.

Upon generation of instruction 133, in addition to the processing in Embodiment 1, method information is put in instruction 133. When there is plenty of information in the binary expression of terminal application 31 itself, an offset to this information may be used. The method information requires the offset of the actual method (i.e., code start location) and the length of the method. To generate the above information, debug information from a compiler is used.

Next, the processing of requesting issue of a terminal application to the secure device will be explained, which corresponds to the operation of (5) in FIG. 4. Thereupon, in addition to the application ID, information for use in selecting command information that authentication information method generator 1014 uses in generating codes (including the model of information processing terminal 30, the type of the CPU, etc.), is transmitted.

Next, the processing of actual issue in secure device will be explained, which corresponds to the operation of (6) in FIG. 4. According to Embodiment 4, processing is performed whereby a method, which refers to an authentication information method that returns values, is generated on a random basis and replaces a dummy method. FIG. 18C illustrates a physical image of a terminal application in which a generated method is embedded.

To be more specific, first, algorithm 10131 is generated on a random basis in the form of formula, converted into program code that suits the information processing terminal 30, and authentication information method 10141 is generated. After authentication information method 10141 is generated, or while it is being generated, values that this authentication method 10141 returns are calculated. These values are stored and used in authentication processing after issue. Information about the location and length of authentication information method 10141 is obtained from the information in instruction 133, and the dummy method is replaced with generated authentication information method 10141. When it is difficult to make the size of authentication information method 10141 longer, authentication information method 10141 will be created within the size of the dummy method.

FIG. 19A and FIG. 19B are examples of an instruction template and an instruction, respectively, for executing the dynamic method of Embodiment 4. Similar to Embodiment 1, the details of the authentication processing include calculating an application authentication key from application authentication information and checking whether or not the same key is shared.

The first line instructs to embed values. This part is the same as in Embodiment 1.

The second line instructs that the dynamic method, that is, the application authentication information to be embedded in terminal application 31, should be embedded not in the form of values but in the form of methods (functions). By embedding the application authentication information in the form of methods (functions), even upon attack from outside, it is possible to make it difficult to analyze and extract the values of application authentication information. The symbols here represent the names of the dummy methods, and they are converted into the offsets and lengths of these methods upon generation of instructions. In the present example, the methods with the names dm1 and dm2 are specified as dummy methods. [0x135, 0x100] indicates that dm1 starts at the 0x135th byte (in hexadecimal notation) and continues 0x100 bytes. [0x33f, 0x80] likewise indicates information about dm2.

The third and fourth lines indicate how to calculate the application authentication key. When instruction 133 is generated, numbers are assigned to the symbols in order of their appearance (i.e. %1, %2, . . . ) and the calculation formula is expressed using these numbers. The meaning of the formula is the same as in Embodiment 1. The value that dm1 returns is put in %6 and the value that dm2 returns is put in %7.

If algorithms are generated here on a completely random basis, codes might be generated that will cause errors, including division by 0, and so they are generated taking certain things into consideration. For example, when division is performed, if the divisor generated from the randoms is 0, processing may be performed such that the divisor may be regenerated or the division will not be performed.

Moreover, depending on the environment of execution, there are cases where information about the resources that terminal application 31 uses is included in the binary expression, so as to verify terminal application 31 prior to execution or to monitor the use of resources during execution and control against excessive use of resources. Under such circumstances, in case changing codes results in changing the resources to use, information such as above is also changed, so as to adjust in accordance with the methods and not to violate the limit and cause errors.

Thus, according to Embodiment 4, not the values of application authentication information that is embedded in terminal application 31, but program code for calculating these values is generated and embedded in the form of methods (functions). Consequently, it is possible to make analysis and automatic extraction of authentication information difficult. Moreover, if the length of the methods can be changed, changing the length of the methods can improve resistance against comparison attacks.

In particular, with this Embodiment 4, the dynamic method is employed. Consequently, authentication information algorithm generator 1013 is able to use the randoms from random generator 1015 and generate formulas that represent the algorithms for calculating application authentication information on a random basis, and change the content of the authentication information methods upon every issue of a terminal application. Therefore, it is possible to more definitely make analysis and automatic extraction of authentication information difficult.

Similar to Embodiment 1, with this embodiment, it is possible to have terminal 31 signed by issue application 12 and basic loader or application loader 33 verifies the signature of terminal application 31 and start this terminal application 31.

By this means, by verifying the signature, it is possible to prevent starting invalid terminal application 31.

Although the application issued in this embodiment is a normal application that starts on information processing terminal 30, the present invention is by no means limited to this, and it is equally possible to issue an arbitrary program such as part of terminal OS 35 of information processing terminal 30 and a VM of JAVA.

Although this embodiment has been described such that, similar to Embodiment 1, application issuer 101 of secure device 10 that issues terminal application 31 is provided with authentication information algorithm generator 1013, authentication information method generator 1014, and authentication information method embedder 1011, which make the configuration for implementing the above-described dynamic method, the present invention is by no means limited to this, and it is equally possible to apply this configuration for implementing the dynamic method of this embodiment to earlier-described Embodiment 2 and Embodiment 3 that also use MTA 34.

In this case, with Embodiment 2, application issuer 101 is provided in secure device 10 (see FIGS. 9 and 10), and so authentication information method embedder 1011 and others for implementing the dynamic method of Embodiment 4 need to be provided in this application issuer 101. However, with Embodiment 3, authentication information method embedder 1011 and others or their functions for implementing the dynamic method of Embodiment 4 need to be provided in terminal application issuer 306 (see FIG. 13) inside MTA 34.

Embodiment 5

Embodiment 5 of the present invention will be described now with respect to a secure device that employs file scrambling, which refers to a technique that, after embedment of application authentication information, arranges the byte stream in the binary expression of a terminal application differently every time to a degree that does not change the details of execution and issues the terminal application.

That is, when the secure device of Embodiment 5 is mounted in an information processing terminal and the information processing terminal requests start of a terminal application, the secure device will rearrange or modify the byte stream in the binary expression of the terminal application to a degree that does not change the details of execution.

When this rearranged terminal application issues and the information processing terminal starts the terminal application, an authentication will be performed between the secure device and the information processing terminal by the application authentication information.

The basic operations of Embodiment 5 are the same as those of Embodiment 1, except that terminal applications are issued by a different method. Therefore, the following will describe the operations of an application issuer of a secure device, which is where the terminal application is issued.

Figure 20:
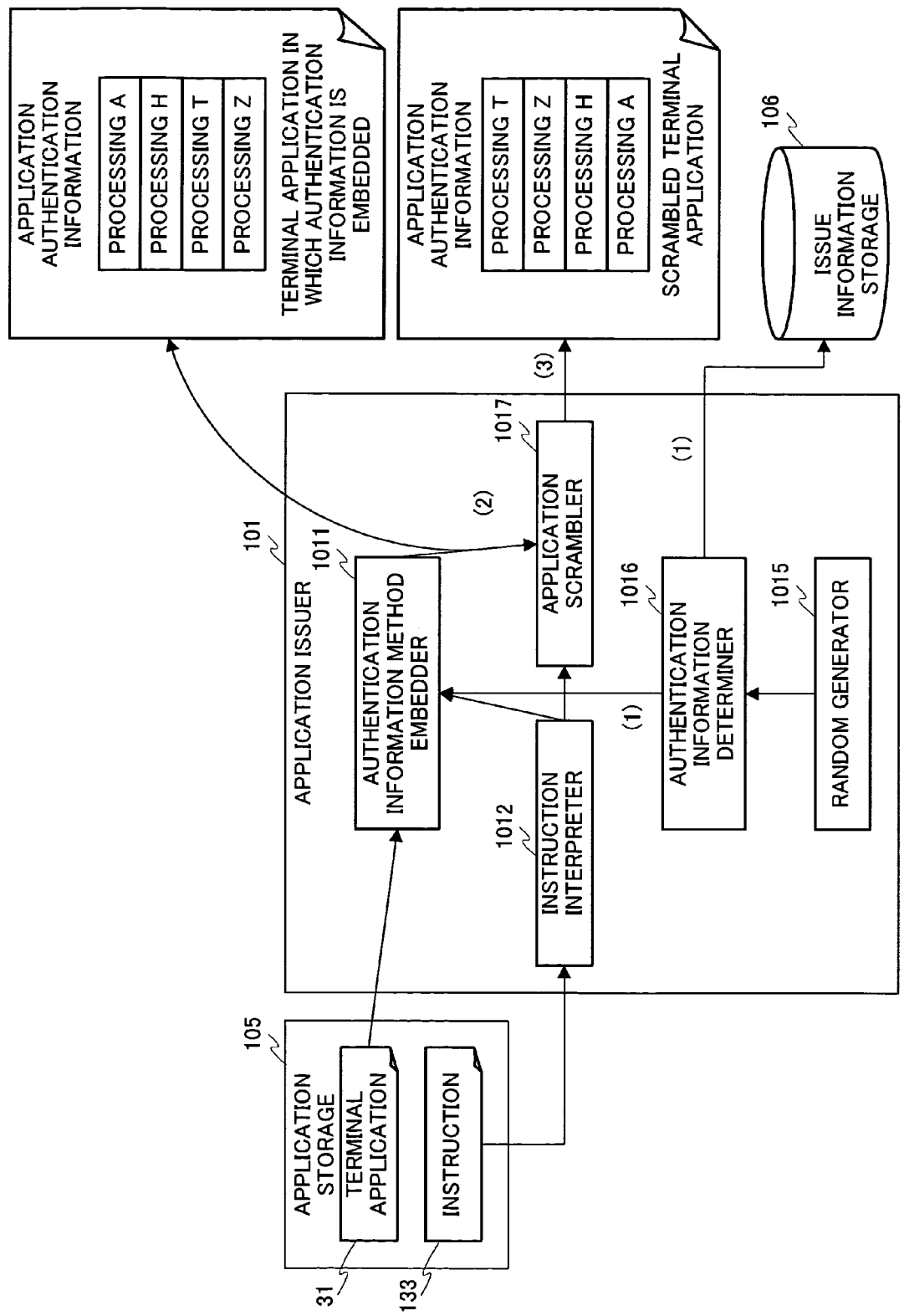
FIG. 20 shows a block diagram of an information processing terminal and a secure device according to Embodiment 5 of the present invention.

FIG. 20 shows the configuration and process flow of the secure device of Embodiment 5 of the present invention.

Referring to FIG. 20, application issuer 101 of secure device 10 has authentication information method embedder 1011 that embeds application authentication information, instruction interpreter 1012 that interprets instruction 133 and tells the method of embedding the application authentication information to authentication information method embedder 1011, random generator 1015 that generates randoms for use in generating values and rearrangement orders on a random basis, authentication information calculator 1016 that calculates the application authentication information that is actually used in authentication, and application scrambler 1017 that rearranges the arrangement of bytes in the binary expression of the terminal application within a range of units that does not change the details of execution.

The operations in FIG. 20 will be described next. Authentication information calculator 1016 uses the randoms from random generator 1015 and calculates application authentication information, passes the application authentication information to application information method embedder 1011, and stores the application authentication information in issue information storage 106 ((1) in FIG. 20).

Application information method embedder 1011 receives the calculated application authentication information, and, following instruction 133, embeds this application authentication information in terminal application 31, and outputs terminal application 31 with the application authentication information embedded therein, to application scrambler 1017 ((2) in FIG. 20).

Application scrambler 1017 receives terminal application 31, in which the application authentication information is embedded, and, following instruction 133 based on the interpretation by instruction interpreter 1012, scrambles and issues terminal application 31, in which the application authentication information is embedded, in a range of units that does not change the details of the execution of terminal application 31 ((3) in FIG. 20) For example, if the terminal application is programmed in JAVA®, scrambling this terminal application in units of per class file such as the field and method will not change the details of execution of terminal application 31.

Next, the specifics of the operations of this embodiment will be explained below with reference to FIG. 4. In the following, only parts that implement different operations from Embodiment 1 will be explained, and the rest of the operations is the same as in Embodiment 1.

First, referring to the operations of (1) to (4) in FIG. 4, preparations for putting terminal application 31 and instruction 133 in secure device 10 will be explained.

Application scrambler 1017 of Embodiment 5 scrambles terminal application 31 in a range of units that does not change the details of the execution of terminal application 31, and, as for the specifics of the scrambling of terminal application 31, the methods of the terminal application are rearranged. So, upon generation of instruction 133, in addition to the processing in Embodiment 1, method information is put in the instruction. When there is plenty of information in the binary expression of terminal application 31 itself, an offset to this information may be used. The method information requires the offset of the actual method (i.e. code start location) and the length of the method.

Depending on the language in which the programming is written, changing the location of the method may change the address, and there may be where a call cannot be made correctly. In such case, such processing will be necessary that changes the call address of the caller of the method, and so the location of where the call is made will be required.

When this information becomes necessary, the information or an offset to this information will be put in instruction 133. To generate the above information, debug information from compiler 23 is used.

If the kind of language is used in which the method to call up is identified by a number in the code, the above change will not be necessary. Still, changing the number of the method and changing also the number to designate upon call up will make it possible to change the code without changing the details of the processing.

If such a language is used in which the method to call up is identified by a name in the code, the above change will not be necessary. Still, changing the name of the method and changing also the name to designate upon call up, will make it possible to change the code without changing the details of the processing.

Next, referring to (6) in FIG. 4, the processing of issuing terminal application 31 in secure device 10 will be explained. For example, in terminal application 31, a decision is made as to which two of a plurality of methods are selected and exchanged, by randoms. Using information about these selected methods, these methods are exchanged. When a change of the caller is necessary, the caller will be changed using information of instruction 133.

FIG. 21A and FIG. 21B are examples of an instruction template and an instruction for file scrambling, respectively.

The first through third lines are the same as in Embodiment 1.

The fourth line indicates scrambling of methods. Each will have additional information about the methods subject to scrambling, upon generation of the instruction. Referring to the fourth line in FIG. 21B, [0x100, 0x180] means that the first method starts at the 0x100th byte and continues 0x180 bytes.

Figures 22A, 22B:
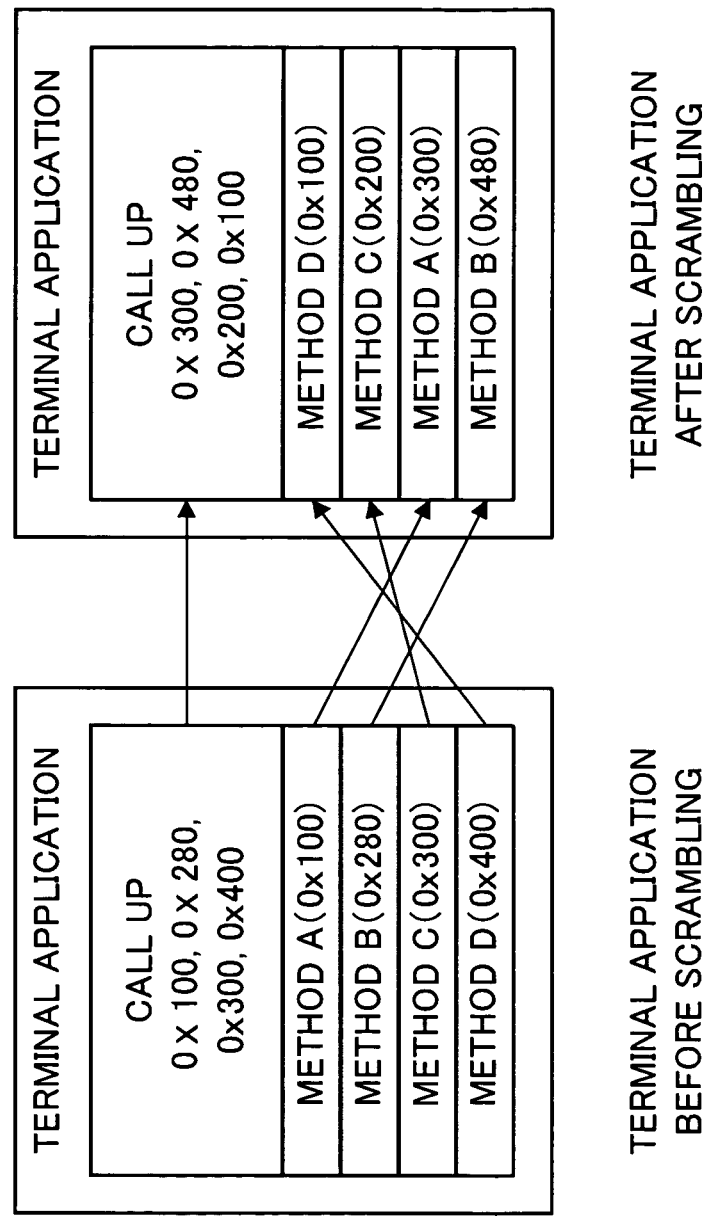
FIG. 22A shows a specific example of a terminal application before scrambling.
FIG. 22B shows a specific example of a terminal application after scrambling.

Change of the caller will be described with reference to FIG. 22A and FIG. 22B. In the parentheses beside the method names are offsets of these methods. Referring to FIG. 22A, the part that calls up the methods specifies and calls up the offsets in the order of A, B, C, and D. In this case, simple exchange will only result in execution of code of unwanted part, and so the correct operation will not be possible.

Therefore, it is necessary to change the offsets of the methods specified by the part that calls up, to offsets for after the exchange. FIG. 22B is a case where this is done, and this operates correctly.

Thus, according to Embodiment 5, application issuer 101 embeds application authentication information in terminal application 31, and thereafter rearranges the byte stream in the binary expression of terminal application 31 within a range of units that does not change the details of the execution, such as in units of per class file such as the field and method, when terminal application 31 is programmed in JAVA®, and issues terminal application 31. Consequently, the location of the application authentication information in terminal application 31 issued by information processing terminal 30 changes upon every issue of scrambled terminal application 31. This makes it difficult to calculate the location of the application authentication information and to have clue for analysis even through comparison of several terminal applications 31 issued by information processing terminal 30, thereby making possible authentication of terminal application 31 while making it difficult to extract the application authentication information automatically.

In addition, the method of this embodiment may be applicable to other fields as well. For example, it may be possible to install software on a per device basis and make the binary expression in the memory medium of the host having the software installed different.

By thus making the binary expression vary on a per device basis, it is possible to improve resistance against tampering such as illegal patches that bypass license authentication code by directly changing the binary expression.

In addition, similar to Embodiment 1, it is also possible to sign terminal application 31 by means of issue application 12 and verify the signature by means of basic loader 32, and thereupon start terminal application 31.

Furthermore, although a case has been described with this embodiment where an issued application is a normal application that starts on information processing terminal 10, the present invention is by no means limited to this, and it is equally possible to issue any arbitrary programs such as part of OS 35 of information processing terminal 30 and a VM of JAVA.

Moreover, if the two of the above-described techniques—that is, the dynamic method technique described in Embodiment 4 whereby not values, but the authentication information methods for calculating these values, are subject to embedment as authentication information, and the technique of file scrambling described in Embodiment 5 whereby application authentication information is embedded in terminal application 31 and thereafter the byte stream in the binary expression of terminal application 31 is rearranged every time in a range of units that does not change the details of the execution, and then terminal application 31 is issued—are used in combination, it is possible to make automatic extraction of application authentication information difficult even through comparison of several terminal applications 31 issued by the information processing terminal.

Embodiment 6

A case will be described with Embodiment 6 of the present invention where part of the elements of information processing terminal 30 of Embodiment 1 are implemented in LSI, which typically is an integrated circuit.

Figure 23:
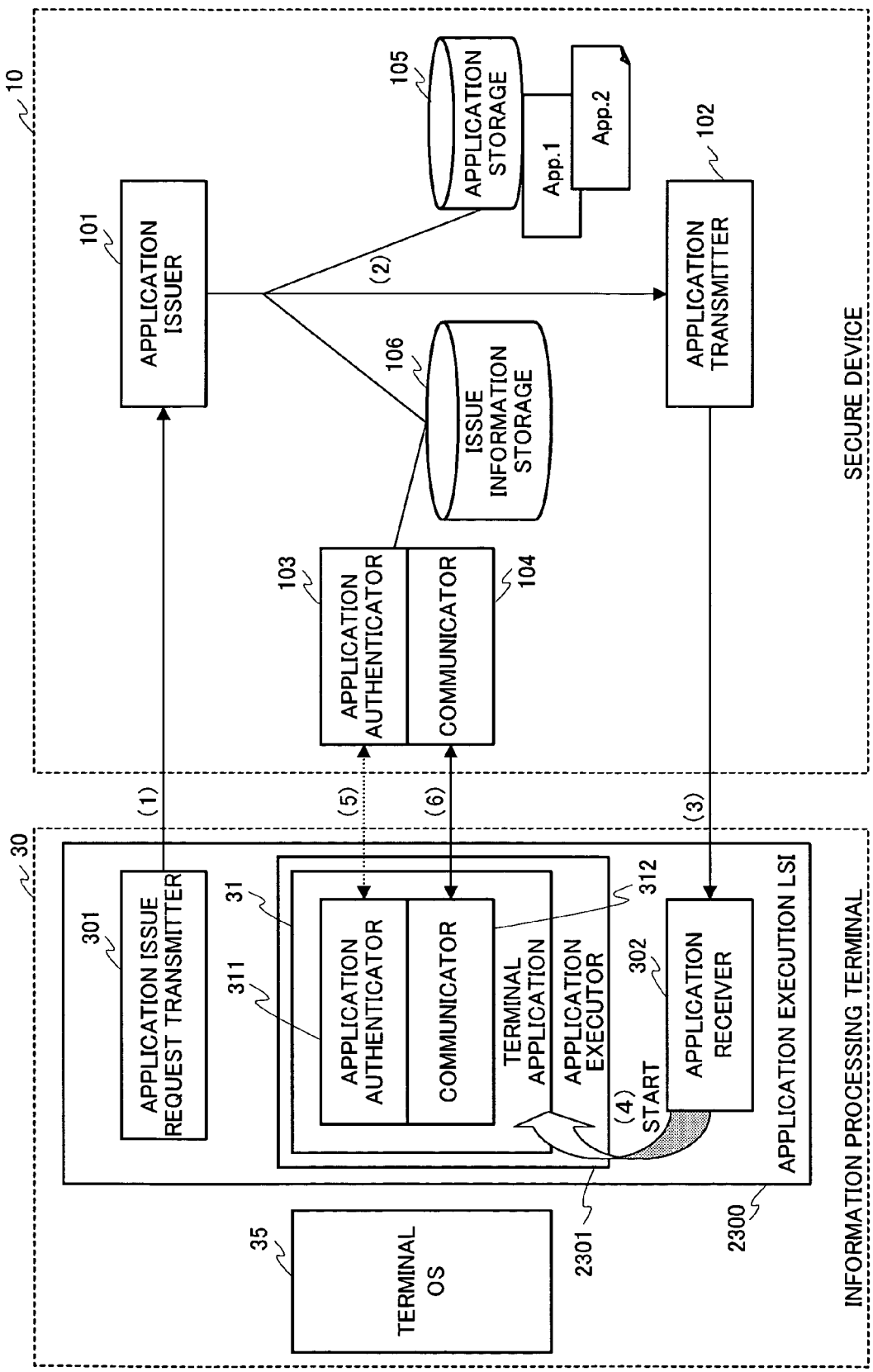
FIG. 23 is a block diagram showing an example of configuration of application execution LSI of an information processing terminal, and a secure device, according to Embodiment 6 of the present invention.

FIG. 23 shows block configurations of information processing terminal 30 and secure device 10 of Embodiment 6.

Information processing terminal 30 has application execution LSI 2300 that requests a terminal application from secure device 10 and executes the terminal application received.

Application execution LSI 2300 has application executor 2301 that executes the terminal applications received from the secure device, and application issue request transmitter 301 and application receiver 302 of Embodiment 1. These can be one chip each, or they may be all included in one chip.

The operation of this embodiment is substantially identical with Embodiment 1, except that codes of the terminal application received from the secure device are executed by means of application executor 2301 of application execution LSI 2300, instead of the terminal OS of information processing terminal 30.

Application execution LSI 2300 allows several methods of implementation, including the method of implementation in custom LSI with the base of CPU core, the method of implementation by means of installing software in general purpose DSP, and the method of implementation in hard-wired dedicated LSI.

Figure 24:
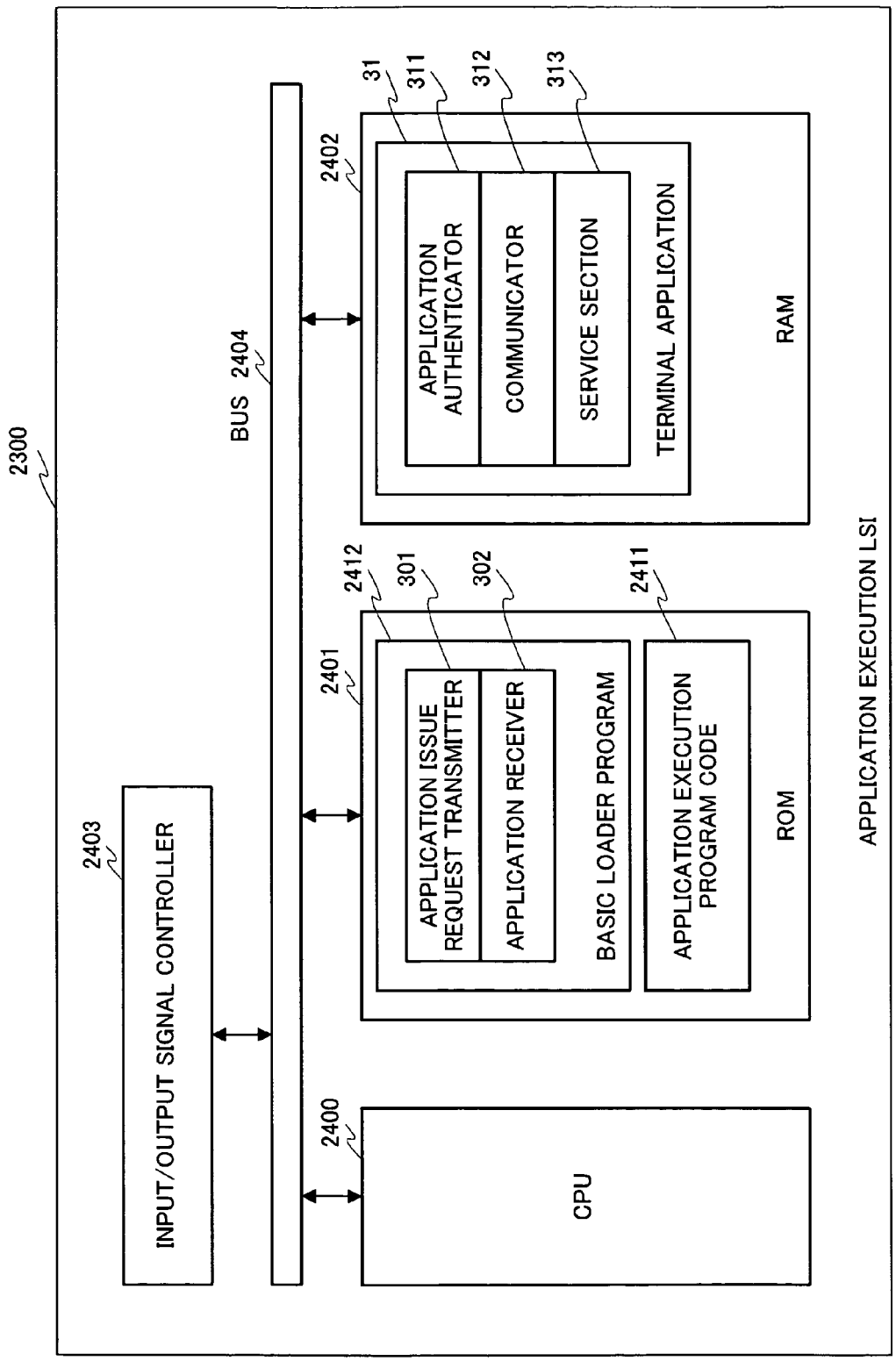
FIG. 24 is a block diagram showing an example of application execution LSI of an information processing terminal according to Embodiment 6 of the present invention.

FIG. 24 shows an example of internal configuration of application execution LSI 2300, that is, a case is shown where application execution LSI 2300 is implemented in custom LSI with the base of CPU core.

Referring to FIG. 24, application execution LSI 2300 has CPU 2400, ROM 2401 that stores basic programs that CPU 2400 executes, RAM 2402 that stores data that CPU 2400 has processed and terminal applications that CPU 2400 executes, input/output signal controller 2403 that controls input and output signals to and from the outside, and bus 2404 that links these.

In this case, CPU 2400, ROM 2401, RAM 2402, and bus 2404 are equivalent to application executor 2301.

In addition, in this case, ROM 2401 and RAM 2402 may be configured with nonvolatile memories such as an EEPROM and FeRAM.

ROM 2401 stores basic loader program code 2412, which is the program code of the basic loader of Embodiment 1, and application executor program code 2411, which is the program code of application executor 2301 that executes terminal applications received from the secure device. For example, when the terminal application is a JAVA application, application executor program code 2411 will be a program code for the JAVA virtual machine that understands and executes JAVA application byte codes.

Upon request from terminal OS 35 received via input/output signal controller 2403, CPU 2400 executes basic loader program code 2412, receives terminal application 31 from secure device 10 and stores it in RAM 2402, and, in addition, executes application execution program code 2411 and executes terminal application 31. Thereafter, as in the case of Embodiment 1, terminal application 31 and secure device 10 perform an authentication using the application authentication information embedded in terminal application 31. FIG. 24 illustrates a state where terminal application 31 received from secure device 10 is stored in RAM 2402.

Thus, according to Embodiment 6, the same effect as by Embodiment 1 can be achieved in a case where part of the elements of information processing terminal 30 of Embodiment 1 is implemented in LSI.

Embodiment 7

A case will be described with Embodiment 7 of the present invention where part of the elements of information processing terminal 30 of Embodiment 2 are implemented in LSI, which typically is an integrated circuit.

Figure 25:
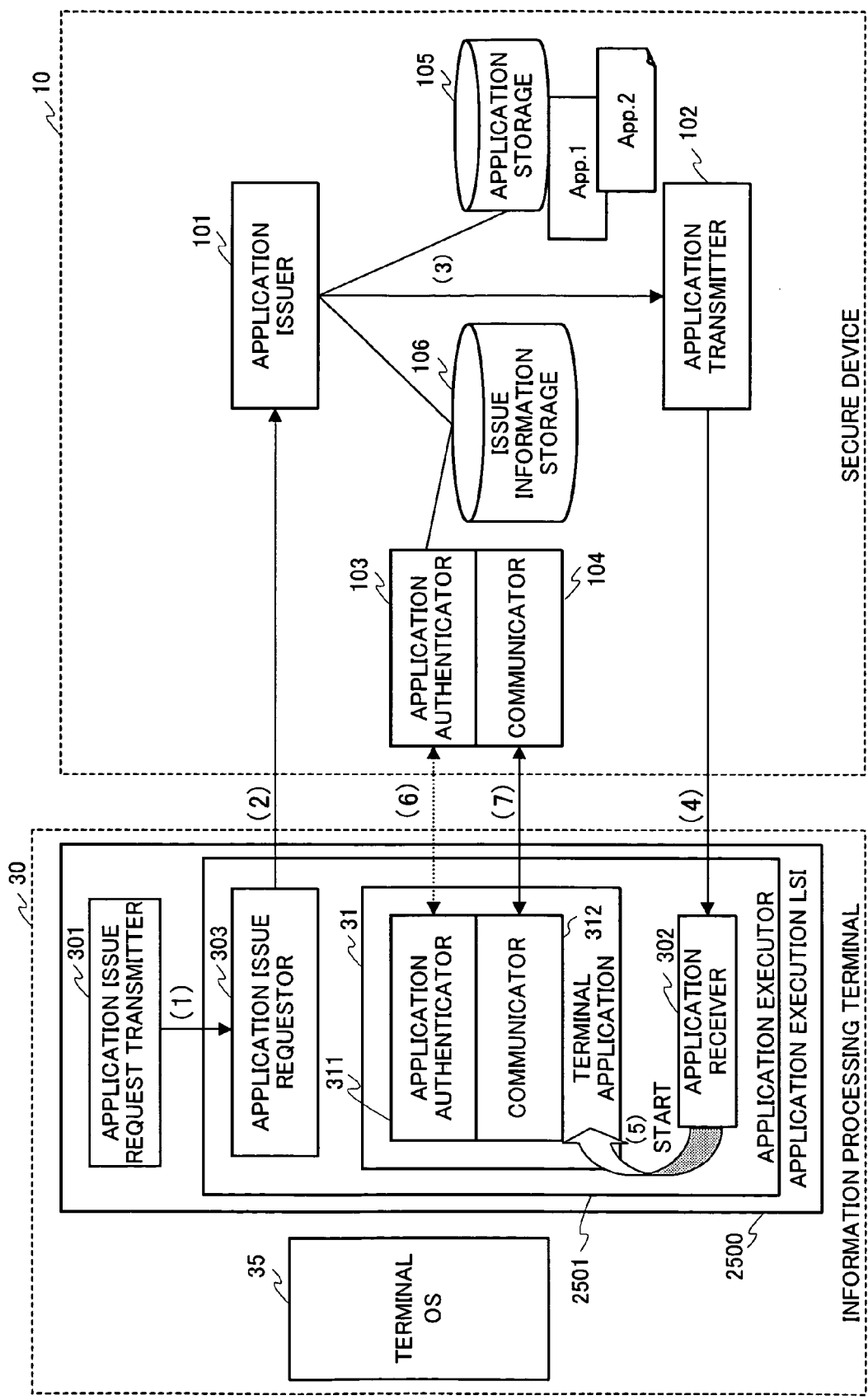
FIG. 25 is a functional block diagram showing an example of configuration of application execution LSI of an information processing terminal and a secure device, according to Embodiment 7 of the present invention.

FIG. 25 shows block configurations of information processing terminal 30 and secure device 10 of Embodiment 7.

Information processing terminal 30 has application execution LSI 2500 that requests terminal application 31 from secure device 10 and executes terminal application 31 received.

Application execution LSI 2500 has application executor 2501 that executes the terminal applications received from the secure device, and application issue request transmitter 301 of Embodiment 2. These can be one chip each, or they may be all included in one chip.

The operation of this embodiment is substantially identical with Embodiment 2, except that codes of the MTA and codes of terminal application 31 received from secure device 10 are executed by means of application executor 2301 of application execution LSI 2500, instead of the terminal OS of information processing terminal 30.

Application execution LSI 2500 allows several methods of implementation, including the method of implementation in custom LSI with the base of CPU core, the method of implementation by means of installing software in general purpose DSP, and the method of implementation in hard-wired dedicated LSI.

Figure 26:
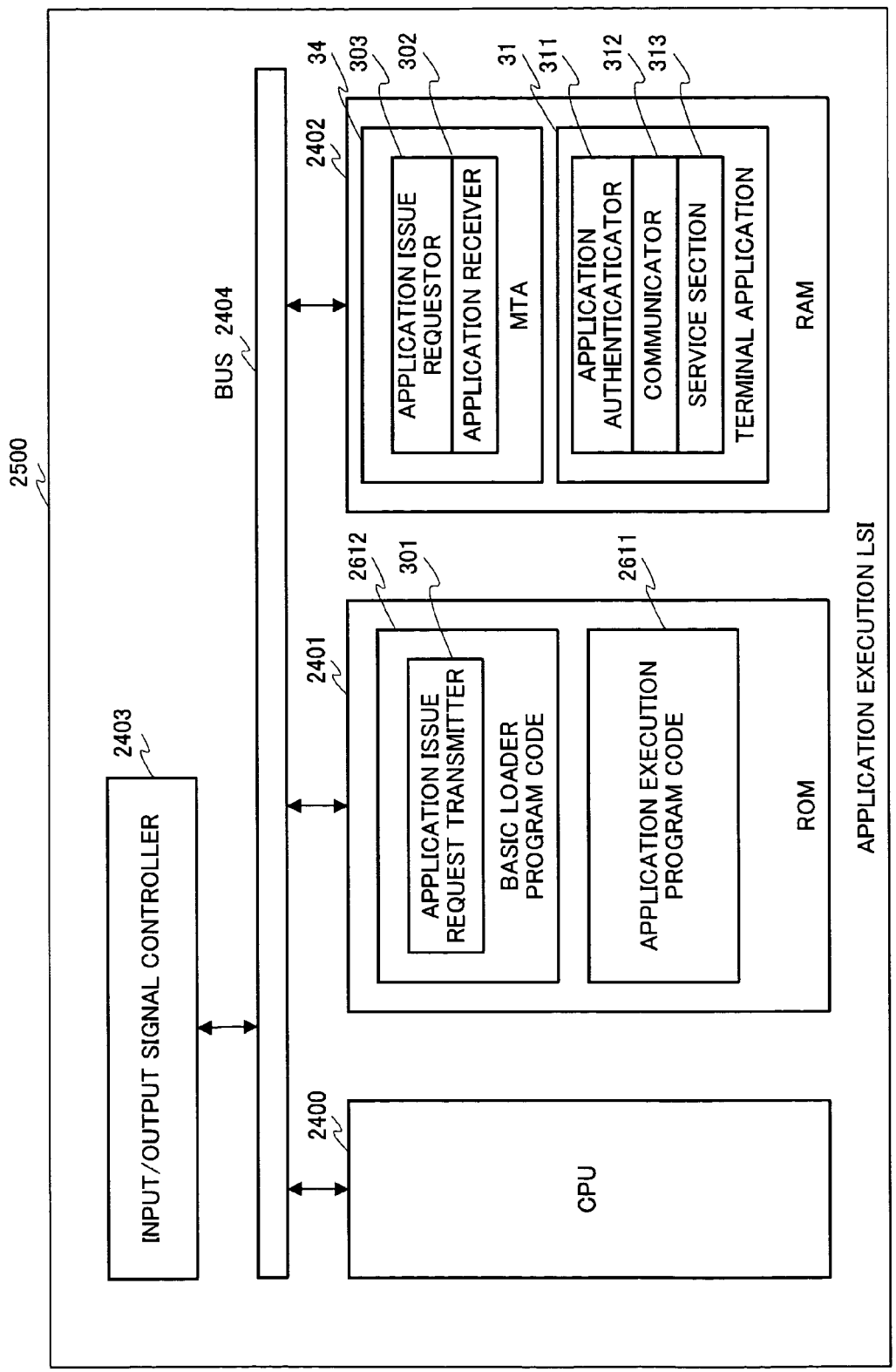
FIG. 26 is a block diagram showing an example of configuration of application execution LSI of an information processing terminal according to Embodiment 7 of the present invention.

FIG. 26 shows an example of internal configuration of application execution LSI 2500, that is, a case is shown where application execution LSI 2500 is implemented in custom LSI with the base of CPU core.

The hardware configuration is the same as application execution LSI 2300 of Embodiment 6.

Referring to FIG. 26, application execution LSI 2500 has CPU 2400, ROM 2401 that stores basic programs that CPU 2400 executes, RAM 2402 that stores data that CPU 2400 has processed and terminal applications that CPU 2400 executes, input/output signal controller 2403 that controls input and output signals to and from the outside, and bus 2404 that links these.

In this case, CPU 2400, ROM 2401, RAM 2402, and bus 2404 are equivalent to application executor 2501. In addition, in this case, ROM 2401 and RAM 2402 may be configured with nonvolatile memories such as an EEPROM and FeRAM.

ROM 2401 stores basic loader program code 2612, which is the program code of the basic loader of Embodiment 2, and application executor program code 2611, which is the program code of application executor 2501 that executes terminal applications received from the secure device. For example, when the terminal application is a JAVA application, application executor program code 2611 will be a program code for the JAVA virtual machine that understands and executes JAVA application byte codes.

Upon request from terminal OS 35 received via input/output signal controller 2403, CPU 2400 executes basic loader program code 2612, and first receives MTA 34 from secure device 10 and stores it RAM 2402, and, in addition, executes application execution program code 2611 and executes MTA 34. MTA 34 and secure device 10 performs authentication processing using the application authentication information embedded in MTA 34. Next, MTA 34 that application executor 2501 executes receives terminal application 31 from secure device 10 and stores it in RAM 2402. Application executor 2501 executes received terminal application 31.

Thereafter, as in the case of Embodiment 2, terminal application 31 and secure device 10 perform an authentication using the application authentication information embedded in terminal application 31. FIG. 26 illustrates a state where terminal application 31 received from secure device 10 is stored in RAM 2402.

Thus, according to Embodiment 7, the same effect as by Embodiment 2 can be achieved in a case where part of the elements of information processing terminal 30 of Embodiment 2 is implemented in LSI.

Embodiment 8

A case will be described here with Embodiment 8 of the present invention where part of the elements of information processing terminal 30 of Embodiment 3 are implemented in LSI, which typically is an integrated circuit.

Figure 27:
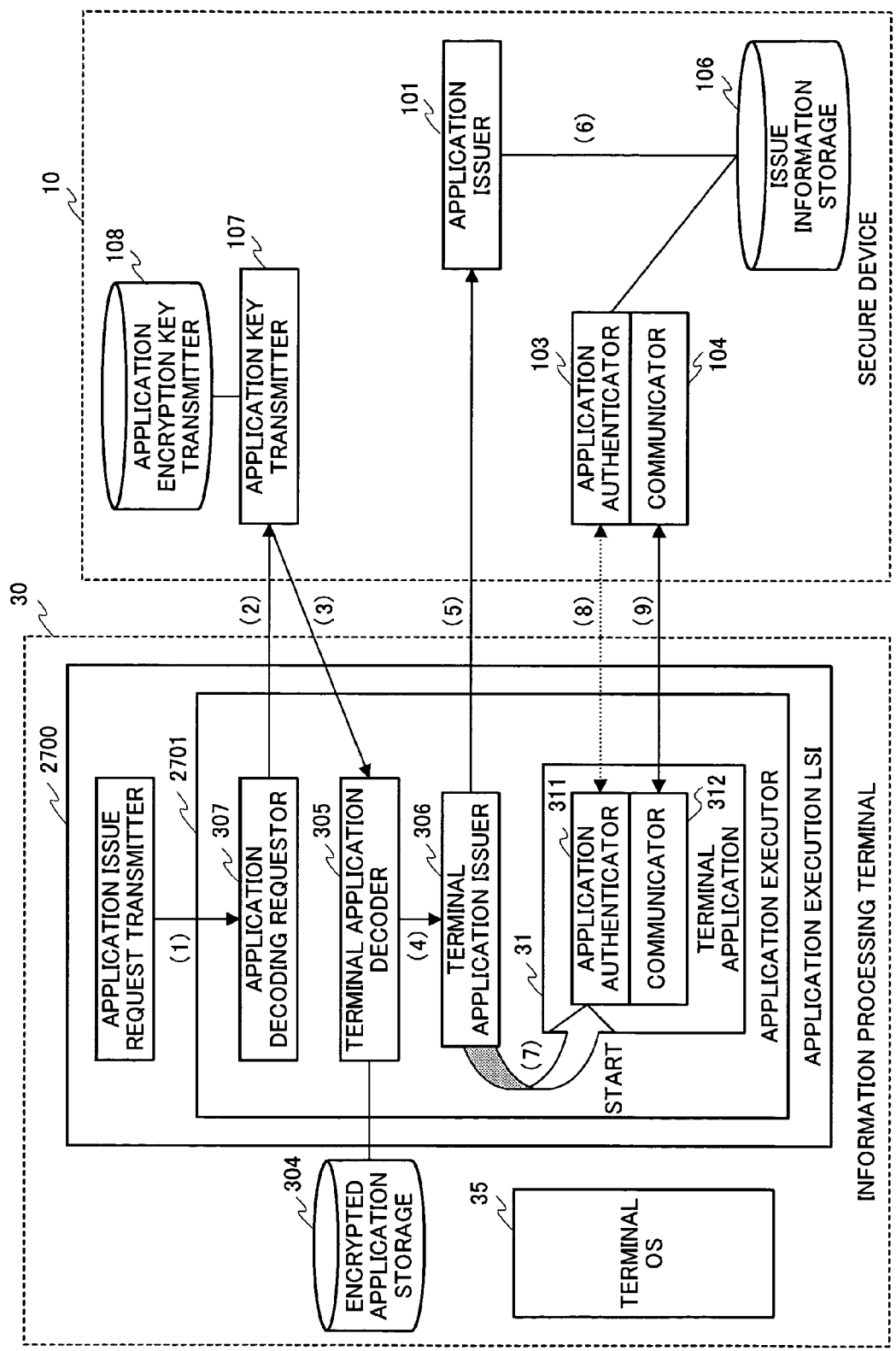
FIG. 27 is a functional block diagram showing application execution LSI of an information processing terminal, and a secure device, according to Embodiment 8 of the present invention.

FIG. 27 shows block configurations of information processing terminal 30 and secure device 10 of Embodiment 8.

Information processing terminal 30 has application execution LSI 2700 that requests a terminal application from secure device 10 and executes the terminal application received.

Application execution LSI 2700 has application executor 2701 that executes the terminal applications received from the secure device, and application issue request transmitter 301 of Embodiment 3. These can be one chip each, or they may be all included in one chip.

The operation of this embodiment is substantially identical with Embodiment 3 except that codes of the MTA and codes of the terminal application received from the secure device are executed by application executor 2701 of application execution LSI 2700 instead of the terminal OS of information processing terminal 30.

Application execution LSI 2700 allows several methods of implementation, including the method of implementation in custom LSI with the base of CPU core, the method of implementation by means of installing software in general purpose DSP, and the method of implementation in hard-wired dedicated LSI.

Figure 28:
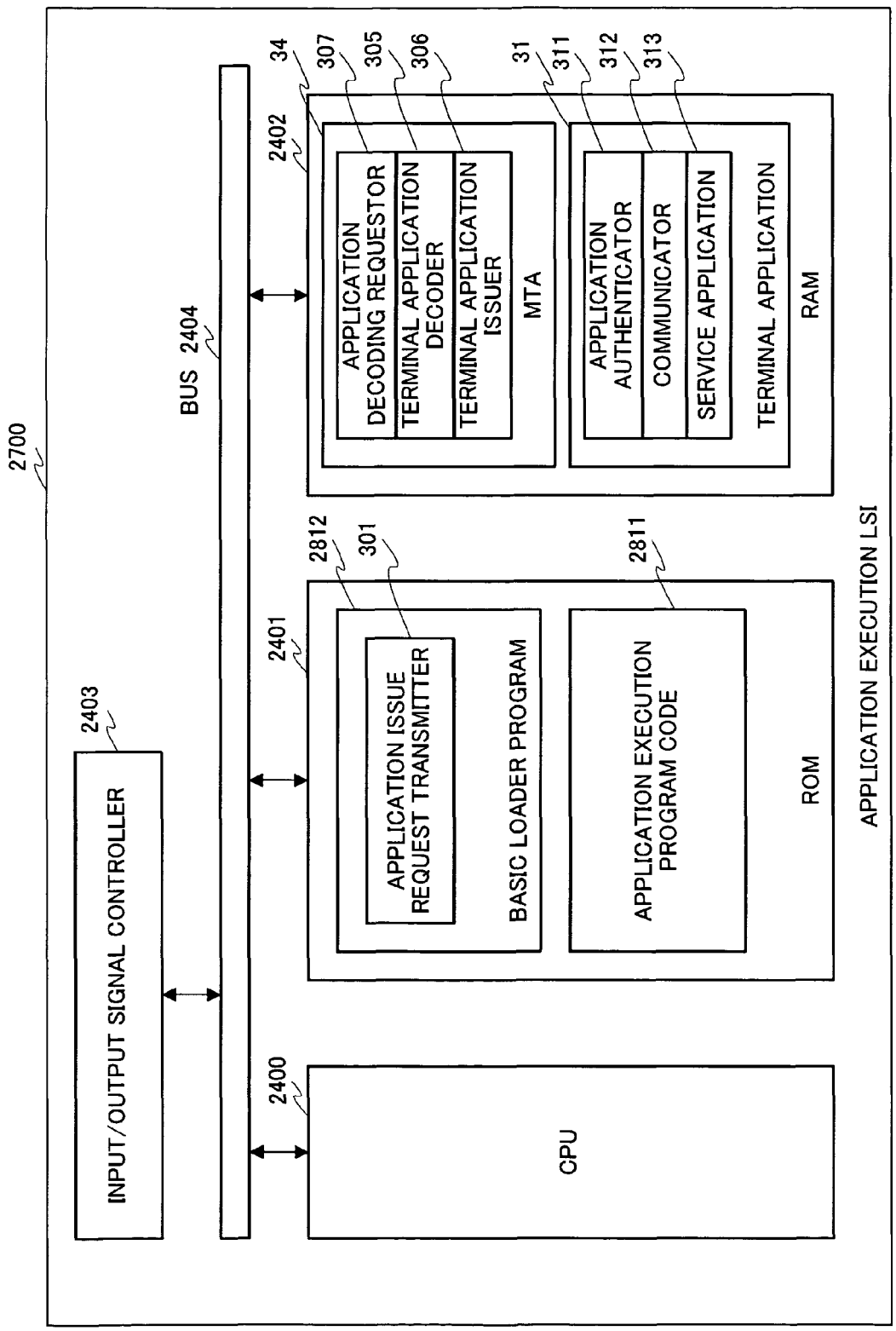
FIG. 28 is a block diagram showing an example of configuration of application execution LSI of an information processing terminal according to Embodiment 8 of the present invention.

FIG. 28 shows an example of internal configuration of application execution LSI 2700, that is, a case is shown where application execution LSI 2700 is implemented in custom LSI with the base of CPU core. The hardware configuration is the same as application execution LSI 2300 of Embodiment 6.

Referring to FIG. 28, application execution LSI 2700 has CPU 2400, ROM 2401 that stores basic programs that CPU 2400 executes, RAM 2402 that stores data that CPU 2400 has processed and terminal applications that CPU 2400 executes, input/output signal controller 2403 that controls input and output signals to and from the outside, and bus 2404 that links these.

In this case, CPU 2400, ROM 2401, RAM 2402, and bus 2404 are equivalent to application executor 2701.

In addition, in this case, ROM 2401 and RAM 2402 may be configured with nonvolatile memories such as an EEPROM and FeRAM.

ROM 2401 stores basic loader program code 2812, which is the program code of the basic loader of Embodiment 3, and application executor program code 2811, which is the program code of application executor 2701 that executes the code of the terminal application received from the secure device. For example, when the terminal application is a JAVA application, application executor program code 2811 will be a program code for the JAVA virtual machine that understands and executes JAVA application bytecodes.

Upon request from terminal OS 35 received via input/output signal controller 2403, CPU 2400 executes basic loader program code 2612, and first receives MTA 34 from secure device 10 and stores it RAM 2402, and, in addition, executes application execution program code 2811 and executes MTA 34. MTA 34 and secure device 10 perform an authentication using the application authentication information embedded in MTA 34.

Next, MTA 34 that application executor 2701 executes receives the application encryption key for terminal application 31 to be started from secure device 10, decodes the encryption of the terminal application stored in encrypted application storage 304, calculates the hash value, and, after verifying that terminal application 31 has not been tampered with, stores this terminal application 31 in RAM 2402.

MTA 34 that application executor 2701 executes generates different application authentication information upon every encryption decoding processing, transmits the information with the application ID to issue application issuer 101, and, in addition, passes this application authentication information to decoded terminal application 31 and starts this terminal application 31 upon application executor 2701. After this, terminal application 31 and secure device 10 perform an authentication using the application authentication information embedded in terminal application 31. FIG. 28 illustrates a state where MTA 34 and terminal application 31 received from secure device 10 is stored in RAM 2402.

Thus, according to Embodiment 8, the same effect as by Embodiment 3 can be achieved in a case where part of the elements of information processing terminal 30 of Embodiment 3 is implemented in LSI.

Although with Embodiment 6, Embodiment 7, and Embodiment 8, the application execution LSI is an LSI system, this is by no means limiting, and this can equally be referred to as an IC, system LSI, super LSI, and ultra LSI, depending on the density.

The method of designing the integrated circuit is by no means limited to LSI, and other implementations are equally possible such as a dedicated circuit and a general purpose processor.

It is equally possible to use an FPGA (Field Programmable Gate Array), which enables programming after the LSI system is made, and a reconfigurable processor, which makes it possible to rearrange the circuit cell connections and configurations in the LSI system.

If new technology of integrated circuit design develops from semiconductor technology or derives from other related fields of technology and replaces LSI technology, such technology can certainly be used to integrate the function blocks. One such possibility is application of biotechnology.

Thus, according to at least one of the above-described secure devices, an application issued by the secure device to the information processing terminal has information for authentication of the application embedded therein, so that the secure device is able to perform an authentication with the application started on the information processing terminal using the information, thereby checking the authenticity of the application.

According to at least one of the above-described secure devices, upon every issue of an application, authentication information of varying values is embedded in the application, so that the information processing terminal has authentication information of varying values every time it starts the application and is able to definitely check the authenticity of the application.

According to at least one of the above-described secure devices, issue information is generated from authentication information embedded in an application, and the application operating on the information processing terminal is authenticated using this issue information, so that it is possible to check the authenticity of the application.

According to at least one of the above-described secure devices, an authentication key is calculated from authentication information embedded in an application, and an authentication is performed using this authentication key, so that the authentication key cannot be learned without knowing what the authentication information represents or without analyzing the calculation method, and thus it is possible to more definitely check the authenticity of the terminal application.

According to at least one of the above-described secure devices, an authentication means apart from an application issuing means calculates an authentication key from authentication information embedded in an application and performs an authentication using this authentication key, so that the authentication key cannot be learned without knowing what the authentication information represents or without analyzing the calculation method, and thus it is possible to more definitely check the authenticity of the terminal application. In addition, in the secure device, the application issuing means is unable to know the application authentication key, and only the authentication means knows the application authentication key, thereby making authentication more independent and more definitely preventing leaks of the authentication key.

According to at least one of the above-described secure devices, after an application started on the information processing terminal is authenticated using an authentication key, communication with this application started on the information processing terminal will be performed sharing a key apart from the authentication key, thereby applying different keys to authentication and communication, making the authentication and communication independent, and thus more definitely preventing leaks of the authentication key and the key used in communication.

According to at least one of the above-described secure devices, an application issuing means sets a certain expiration term on an authentication key, and an authentication means measures time after an application is issued until the application is authenticated. The authentication means performs an authentication when the time is within the expiration term. When the time is greater than the expiration term, the authentication means invalidates the authentication key and does not perform the authentication. Consequently, even when an attempt is made at an illegal attack by way of impersonifying an application, the term of the authentication key will expire while the analysis of the application is taking time, so that it is possible to defend the system from this attack by way of impersonifying the terminal application and detect that there has been an attempted attack.

According to at least one of the above-described secure devices, authentication information is embedded in an application according to an instruction that specifies the method of embedment of the authentication information in the application, so that the secure device is able to embed the authentication information with ease.

According to at least one of the above-described secure devices, authentication information that includes dummy data is embedded in an application, so that, even when the authentication information embedded in the application is extracted from the outside through comparison of several issues of the same application, it is still possible to make it difficult to guess an application authentication key, and, as a result, improve tamper resistance against differential attacks.

According to at least one of the above-described secure devices, an application is programmed to erase authentication information and confidential information received from the secure device upon completion of processing in the information processing terminal, so that information that should not be left in the information processing terminal upon completion of processing in the information processing terminal is definitely erased, and, even if the secure device passes confidential information it holds to the information processing terminal, this information will be definitely erased in the end and will not leak.

According to at least one of the above-described secure devices, an MTA, which is an application that substitutes part of processings of the secure device, is issued to the information processing terminal, and started and authenticated, and thereafter, a non-MTA application will be issued to the information processing terminal and started and authenticated, thereby making the likelihood low that the non-MTA application to be started is analyzed, and enabling the information processing terminal to operate correctly.

According to at least one of the above-described secure devices, after an MTA is issued to the information processing terminal, and started and authenticated, this MTA will request an application issuing means to issue a non-MTA application that enables the information processing terminal to perform processing, thereby making the likelihood low that the non-MTA application to be executed is analyzed, and, consequently, this non-MTA application issued by the information processing terminal will not leak and start more securely.

According to at least one of the above-described secure devices, an MTA requests an application encryption key for decoding an application that is encrypted and saved in the information processing terminal from the secure device, so that the information processing terminal is able to receive the application encryption key from the secure device, decode the encrypted application, and perform issue processing, thereby starting the application more securely even when there is no memory capacity in the secure device for storing a large-capacity application.

According to at least one of the above-described secure devices, upon receipt of an application ID from an MTA, an application encryption key corresponding to the application ID will be transmitted to the MTA, so that the information processing terminal is able to receive the application encryption key from the secure device, decode an application that is encrypted and stored in the information processing terminal and issue this application, thereby starting the application securely in the information processing terminal even when there is no memory capacity in the secure device for storing a large capacity application.

According to at least one of the above-described secure devices, an MTA decodes an application that is encrypted and stored in the information processing terminal using an application encryption key and issue the application, thereby starting the application securely even when there is no memory capacity in the secure device for storing a large capacity application.

According to at least one of the above-described secure devices, an MTA decodes an application that is encrypted and stored in the information processing terminal using an application encryption key, passes and embeds authentication information to and in an encrypted non-MTA application, and receives and passes the authentication information from and to the secure device, so that the decoded encrypted application and the secure device share the authentication information, thereby enabling this secure device to perform an authentication using the authentication information it shares with the encrypted application.

According to at least one of the above-described information processing terminals, the information processing terminal, when starting an application, requests the secure device to issue an application with authentication information embedded therein, receives and executes the application issued from the secure device with authentication information embedded therein, and thereupon performs an authentication of the application between the application and the secure device using the authentication information, thereby checking the authenticity of the application.

According to at least one of the above-described information processing terminals, the information processing terminal requests the secure device to issue an MTA, receives and starts the MTA issued from the secure device, and performs an authentication of the MTA with the secure device using authentication information embedded in the MTA. After that, the MTA requests the secure device to issue a non-MTA application, receives and starts the application, and performs an authentication of the non-MTA application with the secure device using embedded authentication information, thereby making the likelihood low that the non-MTA application to be executed is analyzed, and starting the non-MTA application to be executed more securely.

According to at least one of the above-described information processing terminals, an MTA has an application execution means for executing an application, and this application execution means in the MTA starts a non-MTA application received from the secure device, and performs an authentication of the non-MTA application with the secure device using authentication information embedded in the non-MTA application, so that the secure device is able to rely upon the application execution means that executes the non-MTA application and execute the non-MTA application securely.

According to at least one of the above-described information processing terminals, the information processing terminal requests the secure device to issue an MTA, receives and starts the MTA received from the secure device, performs an authentication of the MTA with the secure device using the authentication information embedded in the MTA, and thereafter the MTA requests an application encryption key from the secure device, receives the application encryption key from the secure device, and decodes the encrypted application and executes the application, thereby starting the application securely even when there is no memory capacity in the secure device for storing a large capacity application.

According to at least one of the above-described information processing terminals, an MTA has an application execution means for executing an application, and this application execution means in the MTA executes an application that is received from the secure device and decoded by means of an application encryption key, so that the secure device is able to rely upon the application execution means that executes the decoded application, thereby executing a non-MTA application securely.

According to at least one of the above-described terminal application generation apparatuses, the terminal application generation apparatus receives the source code of an application that the information processing terminal processes, prepares for embedment of authentication information, outputs a source code in which the authentication information can be embedded and an instruction template, which is a prototype of an instruction that specifies the method of embedment of the authentication information, and compiles the source code in which the authentication information can be embedded into a bytecode that the information processing terminal can execute, generates an instruction from the generated bytecode and the instruction template, and transmits these bytecode and instruction to the secure device and store them in the secure device, so that the secure device obtains the bytecode and instruction to be executed by the information processing terminal.

According to at least one of the above-described application authentication methods, an application issued from the secure device to the information processing terminal has authentication information embedded therein, and the information processing terminal receives and starts the application, and performs an authentication with the secure device based on the authentication information, and the secure device authenticates the application, so that the secure device is able to check the authenticity of the application issued to the information processing terminal.

According to at least one of the above-described secure devices, algorithms for calculating authentication information are generated on a random basis, and these algorithms are converted to command sequences that the information processing terminal can execute and are embedded in an application as part of information for authentication of the application, and issued to the information processing terminal, so that this information for authentication of the application are not embedded in the form of values used for authentication information, but are instead embedded in the form of methods (functions) for calculating these values. Consequently, it is possible to make it difficult to analyze or automatically extract the values used in authentication information, and, when the length of the authentication information methods can be changed, resistance against comparison attacks can be improved by changing the length of the methods.

According to at least one of the above-described secure devices, an application having information for authentication of the application embedded therein is scrambled to a degree that does not change the details of the execution of the application and issued to the information processing terminal, so that the location of the information for authentication of the application in the application issued to the information processing terminal varies by virtue of the scrambling every time the application is issued, thereby making it difficult to determine the location of the information for authentication of the application or to have clue for analysis thereof even through comparison of several applications issued by the information processing terminal, and making it difficult to extract information for authentication of the application.

According to at least one of the above-described integrated circuits of at least one of the above-described information processing terminals, the integrated circuit, when starting an application, requests the secure device to issue an application with authentication information embedded therein, receives the application, and, upon executing the received application, performs an authentication of the application with the secure device using the authentication information, thereby checking the authenticity of the application.

Moreover, according at least one of the above-described integrated circuits in at least one of the above-described information processing terminals, the integrated circuit requests the secure device to issue an MTA, receives the MTA from the secure device, starts the MTA, and performs an authentication of the MTA with the secure device using authentication information embedded in the MTA, and thereafter the MTA requests the secure device to issue a non-MTA application, starts the application, and perform an authentication with the secure device using embedded authentication information, thereby making the likelihood low that the non-MTA application to be executed is analyzed and securely starting the non-MTA application.

According to at least one of the above-described integration circuits of at least one of the above-described information processing terminals, the integrated circuit requests the secure device to issue an MTA, receives the MTA issued by the secure device and starts the MTA, performs an authentication of the MTA with the secure device using the authentication information embedded in the MTA. After that, the MTA requests an application encryption key from the secure device, receives the application encryption key from the secure device, and decodes an encrypted application by means of this application encryption key and executes the application, thereby starting the application securely even when there is no memory capacity in the secure device for storing a large capacity application.

Thus, the terminal application has information for authentication of the terminal application embedded therein and is passed to the information processing terminal, so that, when the terminal application is started by the information processing terminal, an authentication is performed using the information for authentication of the terminal application, thereby checking the authenticity of the terminal application. As a result, it is possible to perform authentication between the secure device and the information processing terminal. The present invention is therefore applicable to various types of secure devices used in various types of information processing apparatuses, including mobile telephones, mobile information terminals (e.g., PDA), personal computers, music playing (and recording) devices, cameras, video cameras, automated teller machines, public terminals, and payment terminals.

The information processing terminal of the present invention is also applicable to any of the above-descried information processing apparatuses.

The present invention is not limited to the above described embodiments, and various variations and modifications may be possible without departing from the scope of the present invention.

This application is based on the Japanese Patent Application No. 2003-288271 filed on Aug. 6, 2003 and the Japanese Patent Application No. 2004-201930 filed on Jul. 8, 2004, entire content of which is expressly incorporated by reference herein.

What is claimed is:
1. A secure device comprising:
a storage that stores predetermined data;
an application storage that stores an application to be processed by an information processing terminal to obtain the predetermined data from the secure device, an information processing terminal obtaining the predetermined data from the secure device by executing the application at the information processing terminal, the information processing terminal not having the application for obtaining the predetermined data from the secure device;
an application issuer that, upon receipt of a request from the information terminal, embeds in the application, as information for an authentication of said application, authentication information which is generated by the secure device on a random basis so as to have a varying value upon every issue of said application;
an application transmitter that transmits, to said information processing terminal, said application in which said information for said authentication of said application is embedded by the secure device and having the varying value upon every issue of said application;
an authenticator that, upon every issue of said application, performs with said information processing terminal an authentication process for said application executed on said information processing terminal, using said information for said authentication of said application embedded in said application, thereby obtaining a different authentication result upon every issue of said application; and
a communicator that transmits to said information processing terminal said predetermined data stored in said storage, when said application executed on said information processing terminal is authenticated.

2. The secure device of claim 1,
wherein the application issuer generates issue information from the authentication information embedded in the application; and
the authenticator performs the authentication process for said application executed on the information processing terminal, using the issue information generated by the application issuer.

3. The secure device of claim 2, wherein, for the issue information, the application issuer generates an authentication key from the authentication information as the issue information.

4. The secure device of claim 3,
wherein the communicator that, after the application operating on the information processing terminal is authenticated by the authenticator using the authentication key, generates a shared key, the shared key being distinct from the authentication key, shares the shared key with the information processing terminal, and performs communications with the information processing terminal using the shared key.

5. The secure device of claim 3,
wherein the application issuer sets a predetermined expiration term of the authentication key; and
wherein the authenticator measures a time after the application issuer issues an application until the application issuer authenticates the application, and, if the time is within the predetermined expiration term, the application issuer performs the authentication, or, if the time is greater than the predetermined expiration term, the application issuer revokes the authentication key and does not perform the authentication.

6. The secure device of claim 1,
wherein the application issuer generates an authentication key from the authentication information embedded in the application; and
wherein the authenticator performs the authentication process for said application executed on the information processing terminal, using the authentication key generated by the application issuer.

7. The secure device of claim 1,
wherein the application issuer embeds the authentication information in the application in accordance with an instruction that specifies a method of embedding the authentication information in the application.

8. The secure device of claim 1,
wherein the application issuer includes dummy data in the authentication information and embeds said authentication information in the application.

9. The secure device of claim 1,
wherein the application is programmed to erase the authentication information upon completion of processing on the information processing terminal.

10. The secure device of claim 1,
wherein the application comprises an MTA (Master Trusted Agent) that has a function to substitute part of processing of the secure device on the information processing terminal, and a non-MTA application; and
wherein the application issuer issues the MTA to the information processing terminal before issuing the non-MTA application.

11. The secure device of claim 10, wherein, when the MTA is issued to and started on the information processing terminal, and authenticated using the authentication information embedded in the MTA, the MTA requests the application issuer through the function to substitute part of processing of the secure device to issue the non-MTA application for enabling the information processing terminal to perform a process executed by the non-MTA application.

12. The secure device of claim 1,
wherein the application comprises an MTA that has a function to substitute part of processing of the secure device on the information processing terminal; and
the information processing terminal stores an encrypted non-MTA application to be processed by the information processing terminal,
wherein, when the MTA is issued to and started on the information processing terminal, and authenticated using the authentication information embedded in the MTA, the MTA requests an application encryption key for decoding the encrypted non-MTA application stored in the information processing terminal from the secure device, through the function to substitute part of processing of the secure device.

13. The secure device of claim 12, further comprising:
an encryption key storage that stores identification information of the non-MTA application comprising an application ID, and an application encryption key corresponding to the non-MTA application; and
an encryption key transmitter that, upon receiving the application ID from the MTA, transmits the application encryption key corresponding to the application ID, to the MTA.

14. The secure device of claim 13, wherein the MTA decodes the encrypted non-MTA application using the application encryption key.

15. The secure device of claim 14, wherein, when the MTA decodes the encrypted non-MTA application using the application encryption key, the MTA transfers, to the information processing terminal and the secure device, the authentication information embedded in the decoded non-MTA application.

16. The secure device of claim 15, wherein the MTA embeds the authentication information in the non-MTA application.

17. The secure device of claim 15, wherein the MTA receives the authentication information from the secure device.

18. The secure device of claim 1, wherein the application issuer comprises:
an authentication information algorithm generator that, on a random basis, generates an algorithm for calculating authentication information;
an authentication information method generator that converts the algorithm generated on a random basis into a command sequence that is executable on the information processing terminal, and generates an authentication information method; and
an authentication information method embedder that embeds in the application the authentication information method as authentication information for authentication of the application and issues the application to the information processing terminal.

19. The secure device of claim 1, wherein the application issuer comprises:
an information calculator that calculates information for authentication of the application, an information embedder that embeds the information for authentication of the application in the application; and
a scrambler that receives the application having the information for authentication of the application embedded therein, scrambles this application to a degree that does not change execution of the application, and issues the application to the information processing terminal.

20. The secure device of claim 1, wherein, upon request for start of terminal application from the user, the application issuer receives a request for issue of said application, and responsive to receipt of the request for issue reads the application from application storage, performs issue processing including embedding application authentication information generated on a random basis upon every issue of terminal application, associates issue-related information including an application identifier of the application and the authentication information and saves these in an information store on the secure device.

21. A terminal application generation apparatus that generates an application to be processed by an information processing terminal and stores the generated application in a secure device that comprises:
a storage that stores predetermined data;
an application storage that stores an application to be processed by an information processing terminal to obtain the predetermined data from the secure device, an information processing terminal obtaining the predetermined data from the secure device by executing the application at the information processing terminal, the information processing terminal not having the application for obtaining the predetermined data from the secure device;
an application issuer that, upon receipt of a request from the information terminal, embeds in the application, as information for an authentication of said application, authentication information which is generated by the secure device on a random basis so as to have a varying value upon every issue of said application;
an application transmitter that transmits, to said information processing terminal, said application in which said information for said authentication of said application is embedded by the secure device and having the varying value upon every issue of said application;

an authenticator that, upon every issue of said application, performs with said information processing terminal an authentication process for said application executed on said information processing terminal, using said information for said authentication of said application embedded in said application, thereby obtaining a different authentication result upon every issue of said application; and a communicator that transmits to said information processing terminal said predetermined data stored in said storage, when said application executed on said information processing terminal is authenticated, the terminal application generation apparatus comprising:

an embedment preparator that receives a source code of the application, prepares for an embedment of authentication information, and outputs the source code, in which the authentication information can be embedded and received, the information having the varying value upon every issue of said application, and an instruction template that comprises a prototype of an instruction specifying a method of the embedment of the authentication information;

a compiler that compiles the source code, in which the authentication information can be embedded upon every issue of said application, into a bytecode that is executable on the information processing terminal, thereby obtaining a different authentication result upon every issue of said application; and an instruction generator that receives the bytecode and the instruction template and generates the instruction, wherein the bytecode and instruction are transmitted to and stored in the secure device.

22. An application authentication method between an information processing terminal connectable to a secure device and the secure device, the method comprising:

storing at the secure device predetermined data;

storing at a secure device an application to be processed by the information processing terminal to obtain the predetermined data from the secure device, the information processing terminal obtaining the predetermined data from the secure device by executing the application at the information processing terminal, the information processing terminal not having the application for obtaining the predetermined data from the secure device;

upon receipt of a request from the information processing terminal embedding in the application at the secure device, as information for authentication of said application, authentication information which is generated by the secure device on a random basis so as to have a varying value upon every issue of said application;

transmitting, from the secure device to the information processing terminal, the application in which the authentication information of the application is embedded by the secure device and having the varying value upon every issue of said application;

performing between the secure device and the information processing terminal an authentication process, upon every issue of said application, of the application by causing the application to execute on the information processing terminal, using the authentication information of the application embedded in the application, thereby obtaining a different authentication result upon every issue of said application; and transmitting from the secure device to the information processing terminal the predetermined data stored in the storage, when the application executed on the information processing terminal is authenticated.

23. The secure device of claim 22, wherein, upon request for start of terminal application from the user, the application issuer receives a request for issue of said application, and responsive to receipt of the request for issue reads the application from application storage, performs issue processing including embedding application authentication information generated on a random basis upon every issue of terminal application, associates issue-related information including an application identifier of the application and the authentication information and saves these in an information store on the secure device.

* * * * *